United States Patent
Hegde et al.

(10) Patent No.: US 12,160,844 B2
(45) Date of Patent: Dec. 3, 2024

(54) METHODS AND APPARATUS TO CONTROL USAGE OF FREQUENCY BANDS FOR WIRELESS COMMUNICATIONS

(71) Applicant: Intel Corporation, Santa Clara, CA (US)

(72) Inventors: Ravindra Hegde, Bangalore (IN); Manu Iyengar, Bangalore (IN); Greeshma Pisharody, Portland, OR (US); Arokianadhin Edgard, Bangalore (IN); Rashmi Hegde, Bangalore (IN); Biswanath Goswami, Banglore (IN)

(73) Assignee: Intel Corporation, Santa Clara, CA (US)

( * ) Notice: Subject to any disclaimer, the term of this patent is extended or adjusted under 35 U.S.C. 154(b) by 699 days.

(21) Appl. No.: 17/133,474

(22) Filed: Dec. 23, 2020

(65) Prior Publication Data

US 2021/0120523 A1    Apr. 22, 2021

(51) Int. Cl.
| | |
|---|---|
| *H04W 64/00* | (2009.01) |
| *H04W 4/029* | (2018.01) |
| *H04W 72/044* | (2023.01) |
| *H04W 72/0453* | (2023.01) |
| *H04W 72/51* | (2023.01) |

(52) U.S. Cl.
CPC ......... *H04W 64/006* (2013.01); *H04W 4/029* (2018.02); *H04W 72/0453* (2013.01); *H04W 72/0473* (2013.01); *H04W 72/51* (2023.01)

(58) Field of Classification Search
CPC ............... H04W 64/006; H04W 4/029; H04W 72/0453; H04W 72/0473; H04W 72/51; H04W 4/38; H04W 4/021; H04W 24/08; H04W 52/02
See application file for complete search history.

(56) References Cited

U.S. PATENT DOCUMENTS

| | | | |
|---|---|---|---|
| 9,685,086 B2 | 6/2017 | Zhang et al. | |
| 2004/0017310 A1* | 1/2004 | Vargas-Hurlston | H04W 64/006 342/357.4 |
| 2018/0234996 A1* | 8/2018 | Khoury | H04W 72/1263 |
| 2018/0359623 A1 | 12/2018 | Kim et al. | |

(Continued)

FOREIGN PATENT DOCUMENTS

| | | |
|---|---|---|
| EP | 3044979 | 6/2020 |
| WO | 2019245420 | 12/2019 |

OTHER PUBLICATIONS

European Patent Office, "Extended European Search Report", mailed in connection with European Application No. 21198569.2, mailed Mar. 15, 2022, 9 pages.

(Continued)

*Primary Examiner* — Kabir A Timory
(74) *Attorney, Agent, or Firm* — HANLEY, FLIGHT & ZIMMERMAN, LLC

(57) ABSTRACT

Methods and apparatus to control usage of frequency bands for wireless communications are disclosed. An example apparatus includes a future location frequency processor to determine a frequency band associated with a future location of a device and an arrival processor to transmit a low power mode interval to the device based on at least one of a time of arrival of the device at the future location or the frequency band associated with the future location.

25 Claims, 12 Drawing Sheets

(56) References Cited

U.S. PATENT DOCUMENTS

2019/0037362 A1   1/2019  Nogueira-Nine
2020/0313464 A1*  10/2020 Leabman .............. H02J 50/402

OTHER PUBLICATIONS

European Patent Office, "Communication Pursuant to Article 94(3) EPC," issued in connection with European Patent Application No. 21198569.2, dated Dec. 6, 2023, 4 pages.
European Patent Office, "Examination Report," in connection with European Patent Application No. 21198569.2, issued Apr. 5, 2023, 6 pages.
European Patent Office, "Communication Pursuant to Article 94(3) EPC," issued in connection with European Patent Application No. 21198569.2, dated Jul. 5, 2024, 4 pages.

* cited by examiner

METHODS AND APPARATUS TO CONTROL USAGE OF FREQUENCY BANDS FOR WIRELESS COMMUNICATIONS

FIELD OF THE DISCLOSURE

This disclosure relates generally to communications, and, more particularly, to methods and apparatus to control usage of frequency bands for wireless communications.

BACKGROUND

Devices are often used to track the condition of assets during transport. For example, the devices include sensors to monitor the conditions associated with the assets and/or products in a shipment, such as a temperature, a humidity, etc. The devices can communicate the conditions to a gateway over unlicensed wireless sub-gigahertz (sub-GHz) frequency bands. The gateway is then able to use Wi-Fi, Bluetooth, satellite, and/or other forms of wireless communication to relay the information from the devices to other systems that are not within the shipment for further analysis.

Figure 1:
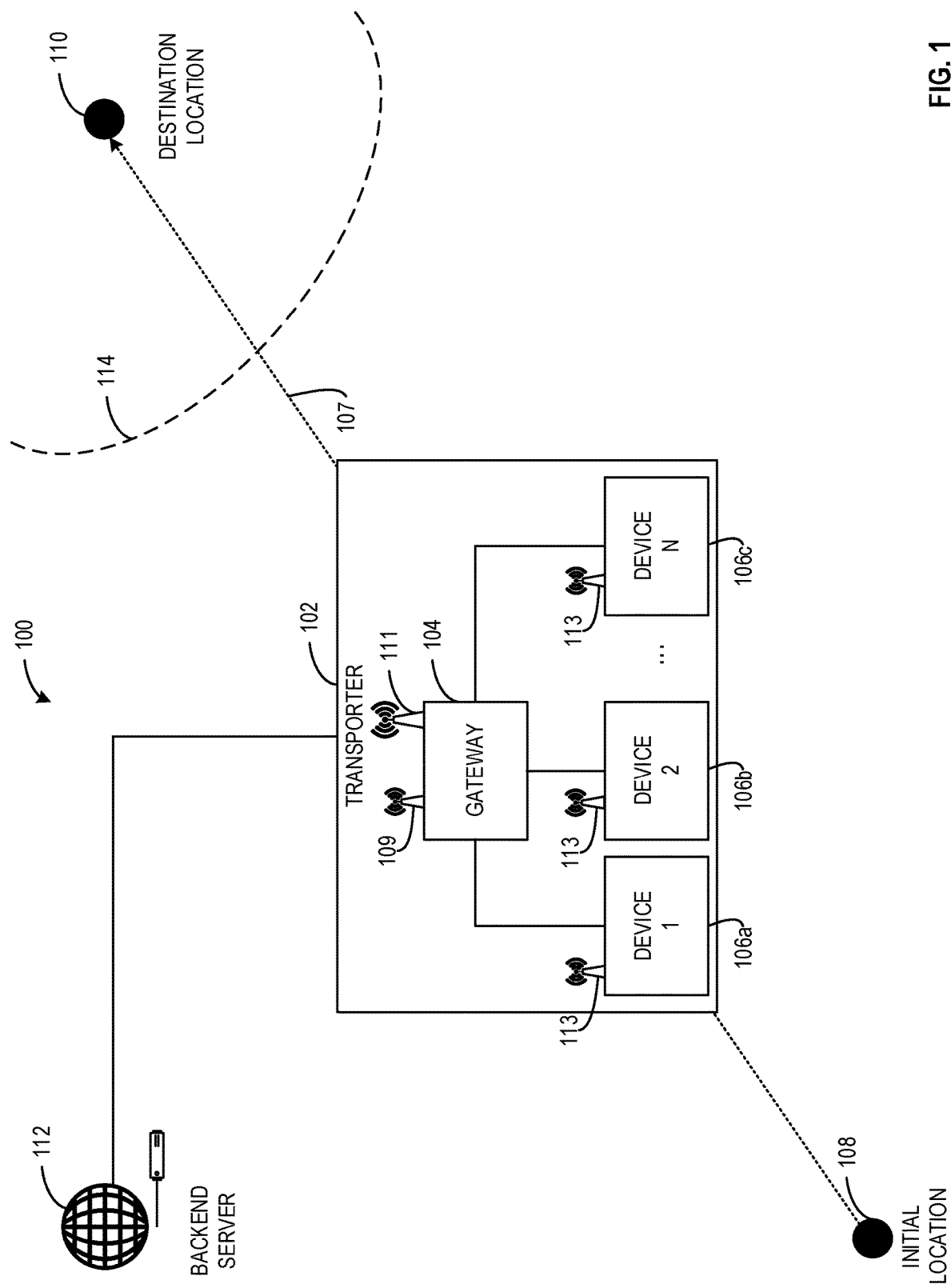
FIG. 1 is an illustration of an example gateway and example devices associated with an example transporter traveling from an initial location to a destination.

The figures are not to scale. Instead, regions may be enlarged in the drawings. Although the figures show different components separated by clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein in the context of describing a bearing and/or heading of an object, the term "substantial bearing" encompasses the bearing of the object and more broadly encompasses a bearing no more than 15 degrees (15°) offset from the bearing of the object. For example, the substantial bearing of an object is any bearing no more than +/−15 degrees (15°) from a current bearing and/or heading of the object.

DETAILED DESCRIPTION

Logistics and asset management applications utilize sensing devices (e.g., condition monitoring sensor edge devices) to track the condition of assets and relay information over unlicensed wireless sub-GHz frequency bands to a gateway. For example, a ship and/or a train (e.g., a transporter) may include devices in one or more freights to track information associated with assets (e.g., a temperature, a humidity, etc.) therein. Further, the devices can communicate with the gateway aboard the ship and/or train via unlicensed wireless sub-GHz frequency band communication protocols (e.g., sub-GHz mesh networking, Low Power Wide Area Networking (LPWAN)), which have a longer range and a lower power consumption than other communication protocols, such as Wi-Fi, Bluetooth, satellite, cellular, etc. In turn, the gateway can record the information associated with the assets in a blockchain accessible by external systems. As such, the external systems can analyze the information to determine an action to be performed, which may include preparations associated with the arrival of the assets at an associated destination.

However, frequencies or frequency bands associated with the unlicensed wireless sub-GHz communications depend on a geographic region associated with the communications. For example, an unlicensed band in the U.S. may be 902-928 megahertz (MHz), whereas an unlicensed band in India may be 865-867 MHz. As such, the frequency band that the devices are able to utilize is dependent on a location of the devices and/or the gateway. Devices that utilize an incorrect frequency band are non-compliant with local regulations, which can lead to hefty fines and/or other legal implications.

In some instances, a device is restricted to specific geographic regions and, thus, does not have to change the associated sub-GHz frequency band used for communications. In some instances, a device includes a Global Positioning system (GPS) and/or a Global Navigation Satellite System (GNSS) to monitor a current location thereof. Accordingly, the device can change the sub-GHz frequency band utilized for communications when the device arrives at a geographic region associated with a different unlicensed frequency band.

In some instances, a device includes a cellular modem to help identify a geographic region in which the device is located. For example, the cellular modem may communicate with a cellular base station to determine the geographic region in which the device is located. Accordingly, other equipment within, or otherwise associated with, the device can determine and indicate a frequency band associated with the geographic region to the device based on the geographic region in which the device is located. In turn, the device can utilize the frequency band indicated by the other equipment to communicate with an associated gateway aboard the ship and/or train.

However, when the device includes the GPS/GNSS and/or cellular modem to determine the location thereof, the device consumes a significant amount of power, which drains the battery of the device. Further, the cellular modem utilizes a significant amount of cellular data to monitor for changes in the geographic region of the device, which affects the cost of an associated data plan. Additionally, utilization of the GPS/GNSS and/or the cellular modem by the device requires the device to have a sufficient amount of compute capacity to be able to change the associated frequency band utilized for communications prior to changing geographic regions. For instance, the device must perform active tracking of the device location to determine an adjustment to the associated frequency band utilized for communications.

Accordingly, utilizing the GPS/GNSS and/or the cellular modem with the devices increases the cost of monitoring the assets associated with the device and necessitates that the device includes additional advanced functionalities, such as a large compute capacity and/or a significant amount of cellular data. Additionally, devices that utilize a low power state (e.g., a sleep mode) are restricted to specific geographic regions and, thus, utilize a single frequency band for all communications with other devices.

Examples disclosed herein control usage of frequency bands for wireless communications with devices that are capable of operating in a low power state. In some examples, a gateway predicts at least one future location of a device based on a current location of the device, a substantial bearing of the device, and/or at least one distance from the location of the device. In such examples, the gateway determines a frequency band (e.g., an unlicensed sub-GHz frequency band) associated with a geographic region of the future location(s) of the device. For example, the gateway can include a geo-boundary database, which allows the gateway to correlate geographic regions and/or locations with their respective frequency bands that can be utilized for unlicensed communications.

In some examples, the gateway determines a predicted time of arrival of the device at a future location based on a speed of the device and a distance to the future location. In some such examples, the gateway determines the predicted time of arrival of the device at the future location in response to the frequency band associated with the future location being different from a frequency band associated with the device and/or a location thereof. Accordingly, the gateway compares a geographic region and/or the frequency band associated with the location of the device to the frequency band and/or geographic region associated with the future location. Thus, the gateway determines the time of arrival of the device at the future location in response to the geographic region of the future location utilizing and/or requiring a different frequency band compared a geographic region of the location of the device.

In some examples, the gateway estimates multiple future locations of the device. In such examples, the gateway determines the time of arrival of the device at the future location that is nearest to the location of the device and in a different geographic region compared to the location of the device.

In some examples, the gateway transmits a low power mode interval and/or a target wake time (TWT) to the device based on the time of arrival of the device at the future location in response to the future location being in the different geographic region and requiring a different frequency band. In such examples, the low power mode interval and/or TWT enables the device to reactivate in advance of the time of arrival at the future location. In some examples, the gateway transmits the frequency band associated with the future location in response to reactivation of the device. As such, the device receives the frequency band associated with the future location from the gateway while using the frequency band associated with the current location. Accordingly, the device is able to communicate with the frequency band associated the future location upon entering the different geographic region and, thus, avoids the fines and other legal implications associated with utilizing a non-compliant frequency band.

In some examples, the gateway transmits a default low power mode interval and/or TWT in response to the frequency band and/or geographic region associated with the future location being identical to the frequency band and/or geographic region associated with the location of the device. In some such examples, the gateway redetermines the future location of the device in response to an expiration of the default low power mode and/or TWT.

FIG. 1 is an illustration of an example logistics session (e.g., an asset and/or product delivery and/or pickup) 100 to be performed by an example transporter 102 including an example gateway 104 and example sensing devices (e.g., condition monitoring edge devices, tags, etc.) 106a, 106b, 106c that wirelessly communicate with the gateway 104 via unlicensed frequency bands (e.g., sub-GHz unlicensed frequency bands). In FIG. 1, the transporter 102 travels along a path of travel 107 to deliver assets (e.g., products) from an initial location 108 to a destination location 110. In FIG. 1, the destination location 110 is in a different geographic region than the initial location 108 and, thus, utilizes a different frequency band for unlicensed wireless communications.

In FIG. 1, the transporter 102 is a ship that transports the assets from the initial location 108 to the destination location 110. Although the transporter 102 is described herein as a ship, it should be understood that the transporter 102 can alternatively be a train or any other another transportation system that transports assets to and from locations. In FIG. 1, the gateway 104 and the sensing devices 106a, 106b, 106c are aboard the transporter 102.

Figure 9:
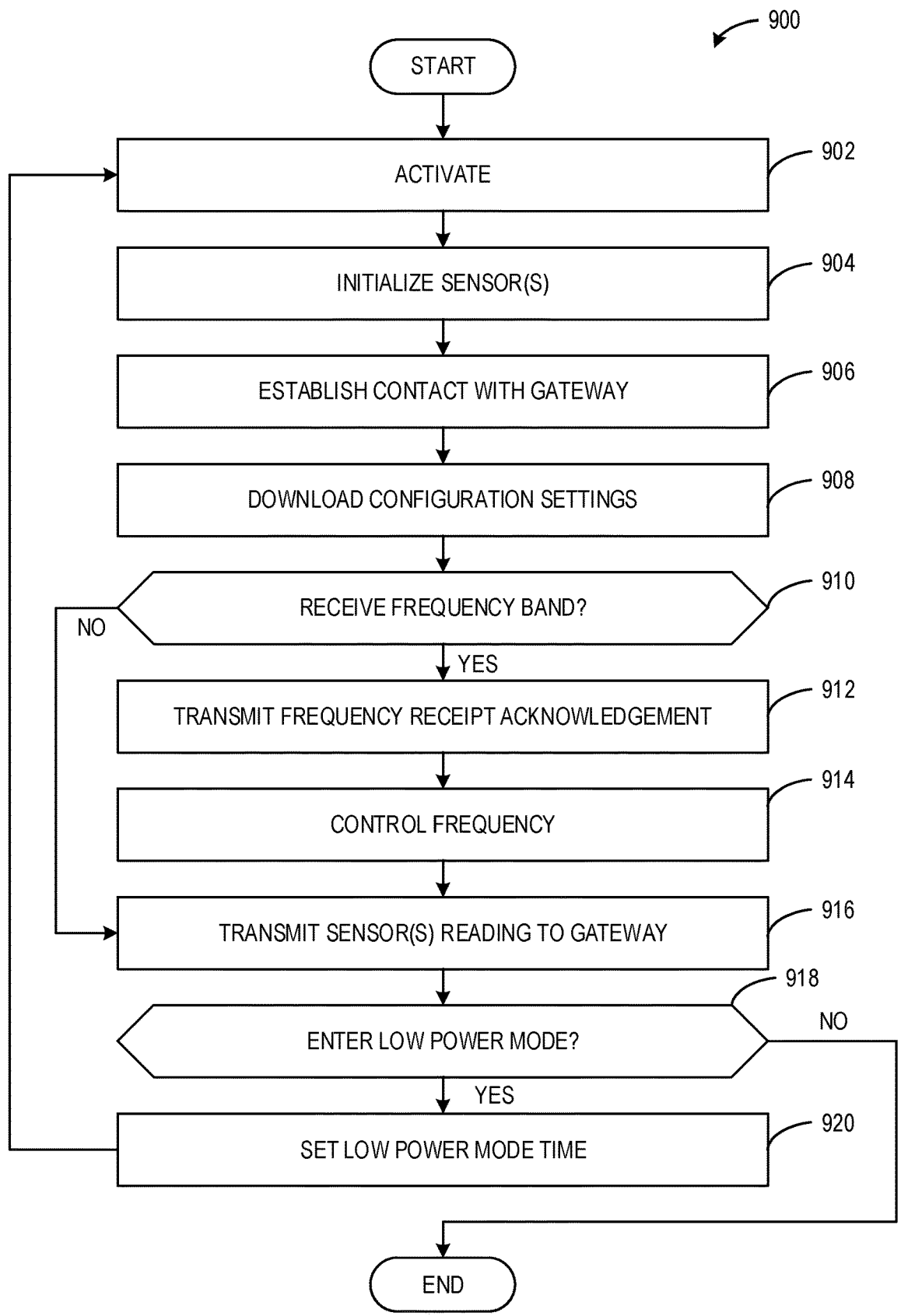
FIG. 9 is a flowchart representative of machine readable instructions which may be executed to implement the example devices of FIGS. 1, 4, and/or 5.

In FIG. 1, the gateway 104 includes an example processor platform, as discussed further in association with FIG. 9, and a first and second antenna 109, 111 for wireless communications. Specifically, the first antenna 109 enables the gateway 104 to wirelessly communicate with the sensing devices 106a, 106b, 106c via a frequency band associated with the geographic region of the gateway 104 and the sensing devices 106a, 106b, 106c. Further, the second antenna 111 enables the gateway 104 to wirelessly communicate with an example backend server 112. In FIG. 1, the gateway 104 is powered by an external power source (e.g., plugged into an outlet in connection with a generator aboard the transporter 102).

In FIG. 1, the sensing devices 106a, 106b, 106c include, and/or are in communication with, sensors that monitor conditions of the assets aboard the transporter 102. For example, the sensing devices 106a, 106b, 106c can include a temperature sensor that monitors a temperature of refrigerated freight aboard the transporter 102. Further, the sensing devices 106a, 106b, 106c can include any other sensor (e.g., a humidity sensor, a radiation sensor, a vibration sensor, a shock sensor, a water sensor, a tilt sensor, a noise sensor, a light sensor, an acceleration sensor, a tamper sensor, etc.) to monitor the conditions of the assets aboard the transporter 102. In turn, the sensing devices 106a, 106b, 106c can be located in a freight containing the assets to be monitored. In FIG. 1, the sensing devices 106a, 106b, 106c include an antenna 113 to communicate the conditions of the assets to the gateway 104 via a frequency band associated with a geographic region in which the transporter 102 is located. In FIG. 1, each of the sensing devices 106a, 106b, 106c is powered by a battery (e.g., a coin-cell battery), although other methods of power (solar, etc.) may be utilized.

In FIG. 1, an example arc 114 is representative of a predetermined distance (e.g., 1 mile, 2 miles, etc.) from the destination location 110 where local regulations change a compliant frequency for wireless communications (e.g., unlicensed wireless sub-GHz communications) from a first frequency band (e.g., a frequency band associated the initial location, 928 megahertz (MHz)) to a second frequency band (e.g., a frequency band associated with the destination location, 868 MHz). In FIG. 1, communications within the arc 114 must utilize the second frequency band while communications outside the arc 114 must utilize the first frequency band. As a result, the gateway 104 and the sensing devices 106a, 106b, 106c adjust the frequency at which they communicate as the transporter 102 approaches the destination location 110. For example, the sensing devices 106a, 106b, 106c utilize the first frequency band for communications with the gateway 104 outside the arc 114 and utilize the second frequency band for communications with the gateway 104 inside the arc 114. The gateway 104 indicates the frequency change to the sensing devices 106a, 106b, 106c, in accordance with teachings disclosed herein.

In FIG. 1, the gateway 104 receives the conditions of assets aboard the transporter 102 from the sensing devices 106a, 106b, 106c via the first antenna 109. Further, the gateway 104 transmits the conditions of the assets to the backend server 112 via the second antenna 111. In FIG. 1, the gateway 104 utilizes, for example, satellite communications to relay the conditions of assets aboard the transporter 102 to the backend server 112. However, the cellular network associated with the cellular communications is not shown in FIG. 1 to simplify and/or more clearly illustrate the logistics session 100. Further, the gateway 104 can utilize any other wireless communication protocol, such as Wi-Fi, Bluetooth, satellite, etc., to communicate with the backend server 112. Accordingly, an operator located at the initial location 108, the destination location 110, and/or any other location may analyze the conditions of the assets aboard the transporter 102 via the backend server 112. Alternatively, data may be collected from the gateway 104 using any alternative method. For example, the operator may utilize a helicopter to land aboard the transporter 102 and connect a portable memory drive (e.g., a flash drive) to a Universal Serial Bus (USB) of the gateway 104 to download the data.

In some examples, the gateway 104 determines a frequency band associated with a future location of the sensing devices 106a, 106b, 106c. In such examples, the gateway 104 determines the future location based on a location of the transporter 102, at least one estimated distance from the location of the transporter 102, and a substantial bearing of the transporter 102. For example, the gateway 104 can estimate a first future location based on a first distance from the location of the transporter 102 within the substantial bearing of the transporter 102. Accordingly, the gateway 104 can estimate a second future location based on a second distance from the location of the transporter 102 within the substantial bearing of the transporter 102.

In FIG. 1, the gateway 104 determines a low power mode interval to be utilized by the sensing devices 106a, 106b, 106c to efficiently manage the battery thereof. As such, the gateway 104 can ensure that the sensing devices 106a, 106b, 106c have a sufficient amount of power to function throughout the logistics session 100. In some examples, the gateway 104 calculates the low power mode interval based on a time of arrival of the transporter 102 and, thus, the sensing devices 106a, 106b, 106c at the future location and/or the frequency band associated with the future location. In some such examples, the low power mode interval is based on the time of arrival at the future location in response to the frequency band associated with the future location being different from the frequency band being utilized by the sensing devices 106a, 106b, 106c. For example, when the gateway 104 determines that the future location of the transporter 102 is inside the arc 114 while the transporter 102 is located outside the arc 114, the gateway 104 can transmit a low power mode interval to the devices 106a, 106b, 106c that enables the sensing devices 106a, 106b, 106c to reactivate prior to entering the arc 114. In some examples, the gateway 104 transmits the frequency band associated with the destination location 110 to the sensing devices 106a, 106b, 106c following the low power mode interval. Accordingly, the sensing devices 106a, 106b, 106c are able to communicate the conditions of the products and/or assets aboard the transporter 102 to the gateway 104 via the frequency band associated with the destination location 110 upon entering the arc 114.

In some examples, the gateway 104 transmits a default low power mode interval to the sensing devices 106a, 106b, 106c in response to the frequency band associated with the future location being identical to a frequency band being utilized by, and/or associated with the location of, the sensing devices 106a, 106b, 106c. For example, the gateway 104 can transmit the default low power mode interval to the devices 106a, 106b, 106c in response to determining that the future location of the transporter 102 is outside the arc 114 and, thus, in a same geographic region as the location of the transporter 102. In some examples, the gateway 104 redetermines the future location of the transporter 102 and, thus, the sensing devices 106a, 106b, 106c in response to an expiration of the default low power mode interval. Accordingly, the gateway 104 can again determine whether the future location is within the arc 114 and, thus, associated with a different frequency band from that which is being utilized by the sensing devices 106a, 106b, 106c.

Figure 2:
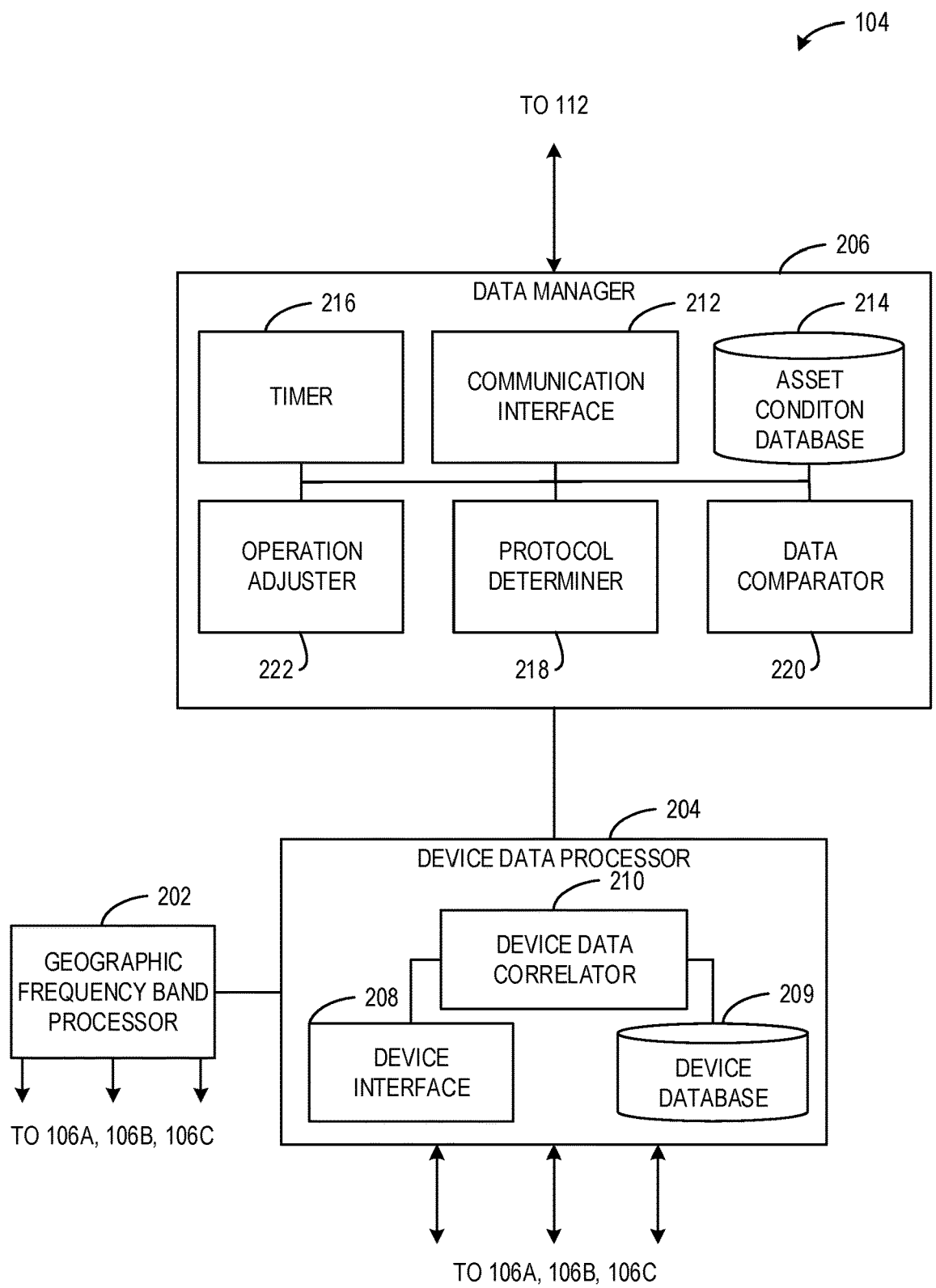
FIG. 2 is a block diagram of the example gateway of FIG. 1.

FIG. 2 is a block diagram of the example gateway 104 of FIG. 1. In FIG. 2, the gateway 104 includes a geographic frequency band processor 202, a device data processor 204, and a data manager 206. In FIG. 2, the device data processor 204 includes a device interface 208, a device database 209, and a device data correlator 210. In FIG. 2, the data manager 206 includes a communication interface 212, an asset condition database 214, a timer 216, a protocol determiner 218, a data comparator 220, and an operation adjuster 222.

Figure 3:
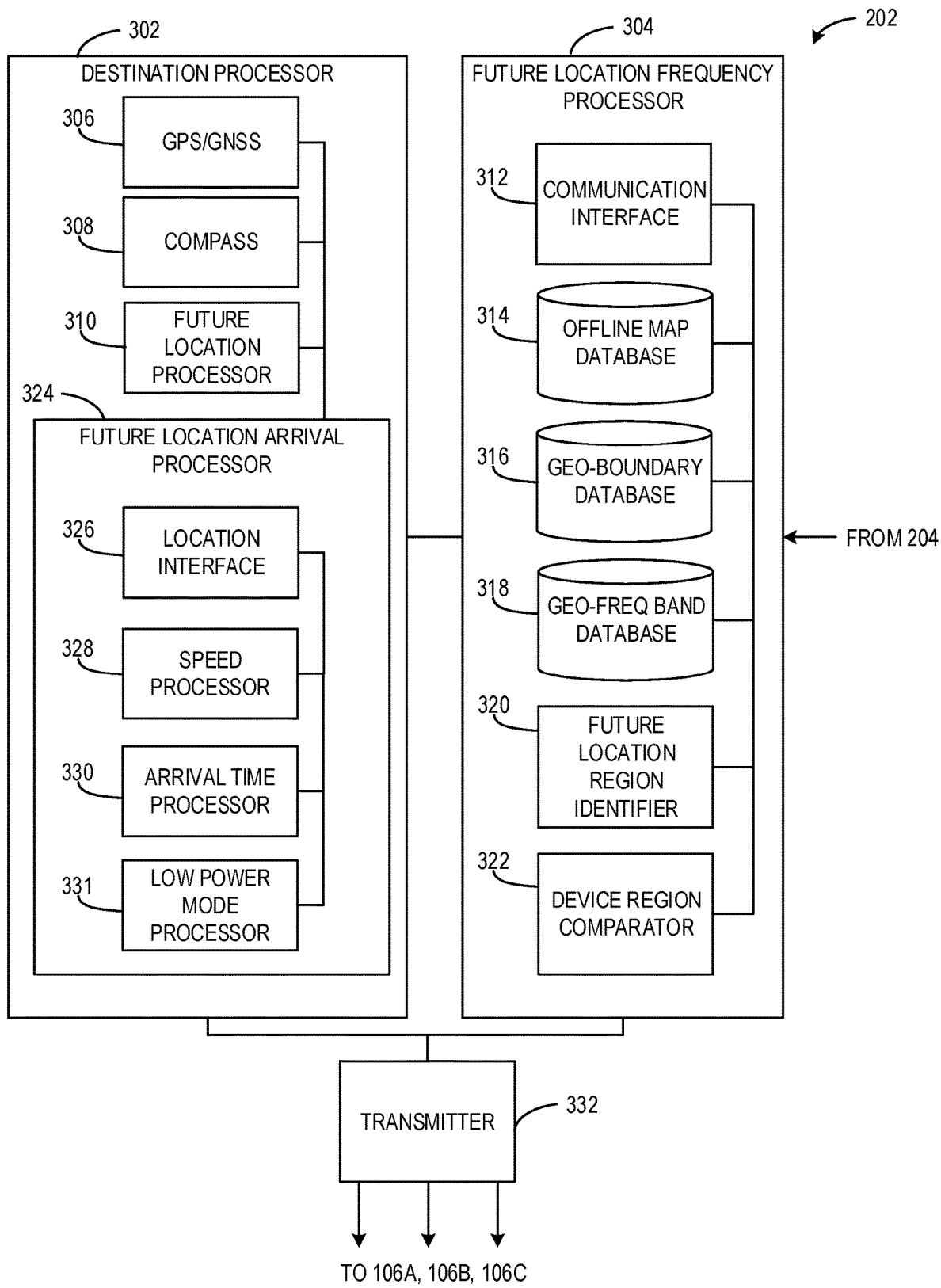
FIG. 3 is a block diagram of an example geographic frequency band processor of the example gateway of FIGS. 1 and/or 2.

In FIG. 2, the geographic frequency band processor 202 determines a low power mode interval and/or a frequency band to be utilized by the sensing devices 106a, 106b, 106c, as discussed further in association with FIG. 3. Accordingly, the geographic frequency band processor 202 determines the frequency band to be utilized by the gateway 104 when communicating with the sensing devices 106a, 106b, 106c. For example, the geographic frequency band processor 202 can transmit the frequency band to the device data processor 204, which utilizes the frequency band to send data requests to the sensing devices 106a, 106b, 106c. Accordingly, the geographic frequency band processor 202 can switch from a frequency band associated with the initial location 108 to a frequency band associated with the destination location 110 in response to transmitting the frequency band associated with the destination location 110 to the sensing devices 106a, 106b, 106c and/or entering the arc 114 of FIG. 1.

In FIG. 2, the device data processor 204 is in communication with the geographic frequency band processor 202, the sensing devices 106a, 106b, 106c, and the data manager 206. In FIG. 2, the device data processor 204 receives data from the sensing devices 106a, 106b, 106c and/or transmits data requests to the sensing devices 106a, 106b, 106c. In FIG. 2, the device data processor 204 receives signals from the sensing devices 106a, 106b, 106c associated with the conditions of the assets aboard the transporter 102 of FIG. 1. In some examples, the device data processor 204 receives acknowledgement receipts from the sensing devices 106a, 106b, 106c in response to the sensing devices 106a, 106b, 106c receiving a frequency band from the geographic frequency band processor 202. In such examples, the device data processor 204 transmits an indication to the geographic frequency band processor 202 in response to receiving the acknowledgement receipt. Accordingly, the indication can include the frequency band being implemented by the sensing devices 106a, 106b, 106c. In some examples, the device data processor 204 transmits a signal to the data manager 206 representative of the conditions of the assets and the respective one of the sensing devices 106a, 106b, 106c associated with the assets.

In FIG. 2, the data manager 206 is in communication with the backend server 112 and the device data processor 204. In some examples, the data manager 206 receives data associated with the conditions of the assets aboard the transporter 102 from the device data processor 204. In some examples, the data manager 206 transmits the conditions of the assets to the backend server 112. Further, the data manager 206 can receive a data request from the backend server 112. Accordingly, the data manager 206 can relay the data request to the device data processor 204, which transmits the request to the sensing devices 106a, 106b, 106c using the frequency band indicated by the geographic frequency band processor 202.

In FIG. 2, the device interface 208 of the device data processor 204 receives signals from the sensing devices 106a, 106b, 106c. For example, the device interface 208 can receive signals representative of the conditions of the assets aboard the transporter 102 and/or the acknowledgement receipts from the sensing devices 106a, 106b, 106c in response to the sensing devices 106a, 106b, 106c receiving a frequency band from the geographic frequency band processor 202. In some examples, identification values associated with respective ones of the sensing devices 106a, 106b, 106c are associated with the signals that the sensing devices 106a, 106b, 106c transmit. In some such examples, the device interface 208 transmits the conditions of the assets and the identification value associated with the received signal to the device data correlator 210. In some examples, the device interface 208 receives the data requests from the data manager 206. In some examples, the device interface 208 transmits the data requests to the sensing devices 106a, 106b, 106c.

In FIG. 2, the device database 209 includes information that correlates the sensing devices 106a, 106b, 106c to associated signals. For example, the device database 209 can include identification values of the sensing devices 106a, 106b, 106c and information regarding the assets that the sensing devices 106a, 106b, 106c are associated with. Accordingly, the identification values associated with a received signal can be utilized to identify the sensing devices 106a, 106b, 106c and/or the associated assets.

In FIG. 2, the device data correlator 210 identifies the sensing device 106a, 106b, 106c (e.g., the location of the sensing devices 106a, 106b, 106c, the assets associated with the sensing devices 106a, 106b, 106c, etc.) associated with the received signal. For example, the device data correlator 210 can identify the sensing devices 106a, 106b, 106c via the device database 209. In some examples, the device data correlator 210 transmits the conditions of the assets and the respective one of the sensing devices 106a, 106b, 106c associated with the assets to the data manager 206.

In FIG. 2, the communication interface 212 of the data manager 206 receives the conditions of the assets aboard the transporter 102 and the respective one of the sensing devices 106a, 106b, 106c associated with the assets from the device data processor 204. In FIG. 2, the communication interface 212 relays the signal to the asset condition database 214, the data comparator 220, and/or the protocol determiner 218. In some examples, the communication interface 212 receives data requests from the backend server 112. In such examples, the communication interface 212 transmits the signal most recently received from the device data processor 204 and/or the data in the asset condition database 214 to the backend server 112. In some examples, the communication interface 212 is a display that presents the signal and/or other notifications to an operator of the gateway 104.

In FIG. 2, the asset condition database 214 stores the conditions of the assets indicated by the sensing devices 106a, 106b, 106c. For example, the asset condition database 214 can include the assets and a temperature, a humidity, a radiation, and/or any other condition associated with the assets as indicated by the sensing devices 106a, 106b, 106c. Accordingly, data associated with the conditions of the assets can be downloaded from the asset condition database 214 for further analysis.

In some examples, the timer 216 provides an indication to the communication interface 212 to transmit the data in the asset condition database 214 to the backend server 112 after a predetermined period of time (e.g., 30, minutes, 1 hour, 4 hours, etc.). For example, the timer 216 can be a 1 hour timer that provides the indication to the communication interface in response to expiring and/or running out of time. In some examples, the timer 216 resets in response to the communication interface 212 transmitting the data to the backend server 112.

In FIG. 2, the protocol determiner 218 determines a protocol associated with the conditions of the assets represented by the signal. For example, the protocol determiner 218 can determine a predetermined temperature range, a predetermined humidity range, and/or any other predetermined conditions that are associated with the assets and/or the respective one of the sensing devices 106a, 106b, 106c. In some examples, the protocol determiner 218 transmits the predetermined condition associated with the assets to the data comparator 220.

In FIG. 2, the data comparator 220 compares the conditions of the assets aboard the transporter 102 to the predetermined conditions associated with the assets. For example, the data comparator 220 can compare the predetermined temperature range associated with refrigerated assets to a temperature sensed by one of the sensing devices 106a, 106b, 106c associated with the assets. In some examples, the data comparator 220 transmits a result of the comparison to the operation adjuster 222.

In FIG. 2, the operation adjuster 222 determines whether an adjustment to the conditions associated with the assets is necessary based on the result of the comparison indicated by the data comparator 220. For example, the operation adjuster 222 can increase or decrease a temperature within a freight containing the assets in response to the temperature sensed by the sensing devices 106a, 106b, 106c being lower or higher than the predetermined temperature range. In some other examples, the operation adjuster 222 provides a notification to an operator indicating an adjustment to the conditions associated with the assets via the communication interface 212. Further, the operation adjuster 222 can determine that no adjustment to the conditions of the assets is necessary in response to the temperature being within the predetermined temperature range.

FIG. 3 is a block diagram of the geographic frequency band processor 202 of the example gateway 104 of FIGS. 1 and/or 2. In FIG. 3, the geographic frequency band processor 202 includes a destination processor 302, a future location frequency processor 304, and a transmitter 332. In FIG. 3, the destination processor 302 includes a Global Positioning System (GPS) and/or a Global Navigation Satellite System (GNSS) 306, a compass 308, a future location processor 310. In FIG. 3, the future location frequency processor 304 includes a communication interface 312, an offline map database 314, a geographic boundary database 316, a geographic frequency band database 318, a future location region identifier 320, and a device region comparator 322. In FIG. 3, the destination processor 302 a location interface 326, a speed processor 328, an arrival time processor 330, and a low power mode processor 331.

In FIG. 3, the destination processor 302 determines and/or predicts a future location(s) of the sensing devices 106a, 106b, 106c. In some examples, the destination processor 302 assigns identification values to the future location(s). In some examples, the destination processor 302 determines that the future location(s) is/are in the different geographic region based on communications with the future location frequency processor 304. In some examples, the destination processor 302 determines a time of arrival at the future location(s) in response to the future location(s) being associated with a different geographic region and, thus, a different frequency band compared to that of the sensing devices 106a, 106b, 106c. In such examples, the destination processor 302 determines the future location that is nearest to the location of the sensing devices 106a, 106b, 106c and associated with the different frequency band. In some examples, the destination processor 302 indicates the identification value of the nearest future location associated with the different frequency band to the future location frequency processor 304. In some examples, the destination processor 302 indicates a time of arrival of the sensing devices 106a, 106b, 106c at the nearest future location associated with the different frequency band to the transmitter 332. In some examples, the destination processor 302 indicates a low power mode interval to be implemented by the sensing devices 106a, 106b, 106c to the transmitter 332. In such examples, the low power mode interval enables the sensing devices 106a, 106b, 106c to reactivate in advance of the time of arrival at the nearest future location associated with the different frequency band.

In FIG. 3, the future location frequency processor 304 determines a frequency band associated with the future location(s). In some examples, the future location frequency processor 304 compares the geographic region and/or frequency band associated with the location of the sensing devices 106a, 106b, 106c to the geographic region and/or frequency band associated with the future location(s). In such examples, the future location frequency processor 304 indicates the identification values of the future location(s) associated with a different geographic region and frequency band compared to that of the sensing devices 106a, 106b, 106c. In some examples, the future location frequency processor 304 receives the identification value of the nearest future location associated with the different frequency band from the destination processor 302. Accordingly, the future location frequency processor 304 transmits the frequency band associated with the nearest future location to the transmitter 332 in response to receiving the identification value of the nearest future location associated with the different frequency band from the destination processor 302. In some examples, the future location frequency processor 304 receives acknowledgement receipts from the device data processor 204 of FIG. 2 indicating a frequency band received by the sensing devices 106a, 106b, 106c. In some examples, the future location frequency processor 304 provides an indication to the transmitter 332 in response to receiving the acknowledgement receipt.

In FIG. 3, the GPS/GNSS 306 determines a location of the sensing devices 106a, 106b, 106c. In some examples, the GPS/GNSS 306 transmits the location of the sensing devices 106a, 106b, 106c to the future location processor 310 and/or the future location arrival processor 324. In such examples, the GPS/GNSS 306 transmits the location of the devices to the future location arrival processor 324 periodically (e.g., every 5 seconds). In some examples, the destination processor 302 transmits the location of the sensing devices 106a, 106b, 106c to the future location frequency processor 304.

In FIG. 3, the compass 308 determines a bearing of the devices 106a, 106b, 106c. In some examples, the future location processor 310 determines the substantial bearing of the sensing devices 106a, 106b, 106c to be plus, or minus 15 degrees from the bearing determined by the compass 308. In some examples, the compass 308 is configured to determine the substantial bearing of the sensing devices 106a, 106b, 106c based on the determined bearing of the sensing devices 106a, 106b, 106c. In such examples, the compass 308 transmits the substantial bearing of the sensing devices 106a, 106b, 106c to the future location processor 310.

In FIG. 3, the future location processor 310 determines the future location of the sensing devices 106a, 106b, 106c based on the location of the sensing devices 106a, 106b, 106c, the substantial bearing of the sensing devices 106a, 106b, 106c, and/or at least one distance from the location of the sensing devices 106a, 106b, 106c. In some examples, the future location processor 310 determines a first bearing, a second bearing, and/or a third bearing of the devices 106a, 106*b*, 106*c* within the substantial bearing of the sensing devices 106*a*, 106*b*, 106*c*. In some examples, the future location processor 310 determines the at least one distance from the location of the sensing devices 106*a*, 106*b*, 106*c* randomly. In some examples, the at least one distance from the location of the sensing devices 106*a*, 106*b*, 106*c* is predetermined during initialization of the gateway 104 and/or the geographic frequency band processor 202. In FIG. 3, the future location processor 310 determines a first, second, and third distance (e.g., 5 miles, 10 miles, 20 miles, etc.) from the location of the devices 106*a*, 106*b*, 106*c*.

Further, the future location processor 310 can determine a first future location of the devices 106*a*, 106*b*, 106*c*, a second future location of the sensing devices 106*a*, 106*b*, 106*c*, and/or a third future location of the devices 106*a*, 106*b*, 106*c* based on the first, second, and/or third bearing of the sensing devices 106*a*, 106*b*, 106*c* and the first distance (e.g., 5 nautical miles) from the location of the devices 106*a*, 106*b*, 106*c*. Further, the future location processor 310 can determines a fourth, fifth, and/or sixth future location of the sensing devices 106*a*, 106*b*, 106*c* based on the first, second, and/or third bearing of the sensing devices 106*a*, 106*b*, 106*c* and the second distance (e.g., 10 nautical miles) from the location of the sensing devices 106*a*, 106*b*, 106*c*. In some examples, the future location processor 310 determines a seventh, eighth, and/or ninth future location of the sensing devices 106*a*, 106*b*, 106*c* based on the first, second, and/or third bearing of the sensing devices 106*a*, 106*b*, 106*c* and the third distance from the location of the sensing devices 106*a*, 106*b*, 106*c*. In some examples, the future location processor 310 assigns identification values to the future locations of the devices 106*a*, 106*b*, 106*c*. Although in this example future location processor 310 can determine up to nine future locations of the sensing devices 106*a*, 106*b*, 106*c*, it should be understood that any number of future locations may be determined using any number of distances from the location of the sensing devices 106*a*, 106*b*, 106*c* and/or any number of bearings within the substantial bearing of the sensing devices 106*a*, 106*b*, 106*c*. In FIG. 3, the future location processor 310 transmits the future location (e.g., the first, second, third, fourth, fifth, sixth, seventh, eighth, and/or ninth future location) of the sensing devices 106*a*, 106*b*, 106*c* to the future location arrival processor 324 along with the associated identification values. In some examples, the future location processor 310 transmits the future location of the sensing devices 106*a*, 106*b*, 106*c* and the associated identification values to the future location frequency processor 304.

In FIG. 3, the communication interface 312 receives the location of the sensing devices 106*a*, 106*b*, 106*c* and/or the future location of the sensing devices 106*a*, 106*b*, 106*c* and the associated identification values from the destination processor 302. In some examples, the communication interface 312 transmits the received location of the sensing devices 106*a*, 106*b*, 106*c* to the offline map database 314 and/or the device region comparator 322. In some examples, the communication interface 312 transmits the received future location of the sensing devices 106*a*, 106*b*, 106*c* (e.g., the first, second, third, fourth, fifth, sixth, seventh, eighth, and/or ninth future location) and the associated identification values to the future location region identifier 320.

Further, the communication interface 312 can receive acknowledgement receipts from the device data processor 204 of FIG. 2 indicating a frequency band received by the sensing devices 106*a*, 106*b*, 106*c*. In some examples, the communication interface 312 indicates the frequency band received by the sensing devices 106*a*, 106*b*, 106*c* to the device region comparator 322. In some examples, the communication interface 312 provides an indication to the transmitter 332 in response to the communication interface 320 receiving the acknowledgement receipt.

In FIG. 3, the offline map database 314 includes a geographic map of Earth and/or a portion thereof. In some examples, the offline map database 314 stores a location of the sensing devices 106*a*, 106*b*, 106*c* in the geographic map in response to receiving the location from the communication interface.

In FIG. 3, the geographic boundary database 316 includes geographic boundaries where frequency band changes occur. For example, the geographic boundary database 316 can include a range of coordinates that indicate where regulations change from utilizing a first frequency band for communications to a second frequency band. Accordingly, the range of coordinates can indicate a perimeter and/or a border of different geographic regions, such as the arc 114. In some examples, the geographic boundary database 316 includes identifiers (e.g., North America, India, Europe, etc.) indicating the geographic region enclosed by the perimeter.

In FIG. 3, the geographic frequency band database 318 includes frequency bands associated with geographic regions. For example, the geographic frequency band database 318 can include the identifiers of the geographic regions and the associated frequency bands that regulations enable in the geographic regions. Accordingly, the geographic frequency band database associates North America with a 902-928 MHz frequency band, India with an 865-867 MHz frequency band, and Europe with an 868 MHz frequency band.

In FIG. 3, the future location region identifier 320 determines a geographic region associated with the future location of the sensing devices 106*a*, 106*b*, 106*c*. In some examples, the future location region identifier 320 identifies the future location and/or coordinates thereof via the offline map database 314. In some examples, the future location region identifier 320 determines the geographic region associated with the future location of the sensing devices 106*a*, 106*b*, 106*c* via the geographic boundary database 316. For example, the future location region identifier 320 can identify a geographic boundary that the future location is within based on the location and/or coordinates of the future location. In some examples, the future location region identifier 320 transmits the geographic region associated with the future location to the device region comparator 322. In such examples, the future location region identifier 320 transmits the identification value associated with the future location to the device region comparator 322.

In some examples, the future location region identifier 320 determines a frequency band (e.g., an unlicensed sub-GHz frequency band) associated with the geographic region of the future location via the geographic frequency band database 318. As a result, the future location region identifier 320 determines the frequency band associated with the future location. In such examples, the future location region identifier 320 transmits the frequency band associated with the future location to the device region comparator 322.

In FIG. 3, the device region comparator 322 determines a geographic region of the sensing devices 106*a*, 106*b*, 106*c* based on the location of the sensing devices 106*a*, 106*b*, 106*c*. For example, the device region comparator 322 can identify the location of the sensing devices 106*a*, 106*b*, 106*c* via the offline map database 314. Further, the device region comparator 322 can determine the geographic region associated with the location of the sensing devices 106*a*, 106*b*, 106*c* via the geographic boundary database 316. In FIG. 3, the device region comparator 322 receives the future location of the sensing devices 106a, 106b, 106c and the associated identification values from the future location region identifier. In some examples, the device region comparator 322 compares the geographic region of the sensing devices 106a, 106b, 106c to the geographic region associated with the future location. In such examples, the device region comparator 322 determines the frequency band associated with the future location of the sensing devices 106a, 106b, 106c the geographic frequency band database 318 in response to the geographic region associated with the future location being different from the geographic region of the sensing devices 106a, 106b, 106c. Accordingly, the device region comparator 322 can indicate the frequency band associated with the future location of the sensing devices 106a, 106b, 106c to the transmitter 332 in response to the geographic region associated with the future location being different from the geographic region of the sensing devices 106a, 106b, 106c. In some examples, the device region comparator 322 indicates the identification value of the future location that is in a different geographic region and, thus, associated with a different frequency band to the destination processor 302. In some examples, the device region comparator 322 indicates the frequency band associated with the future location to the transmitter 332 in response to receiving the identification value associated with the future location.

In some examples, the device region comparator 322 receives the frequency band being utilized by the sensing devices 106a, 106b, 106c via the communication interface 312. In some examples, the device region comparator 322 receives the frequency band associated with the future location of the sensing devices 106a, 106b, 106c from the future location region identifier 320. In some other examples, the device region comparator 322 determines the frequency band associated with the future location of the sensing devices 106a, 106b, 106c in response to receiving the geographic region of the future location via the future location region identifier 320. In some examples, the device region comparator 322 compares the frequency band being utilized by the sensing devices 106a, 106b, 106c to the frequency band associated with the future location of the sensing devices 106a, 106b, 106c. Accordingly, the device region comparator 322 can indicate the frequency band associated with the future location of the sensing devices 106a, 106b, 106c to the transmitter 332 in response to the frequency band being different from the frequency band being utilized by the sensing devices 106a, 106b, 106c.

In FIG. 3, the future location arrival processor 324 of the destination processor 302 extracts a location of the sensing devices 106a, 106b, 106c periodically via the GPS/GNSS 306. In FIG. 3, the future location arrival processor 324 determines a speed of the sensing devices 106a, 106b, 106c and, thus, the transporter 102 based on a distance between consecutively received locations and an elapsed period of time. In FIG. 3, the future location arrival processor 324 receives the future location of the sensing devices 106a, 106b, 106c from the future location frequency processor 310. In FIG. 3, the future location arrival processor 324 determines a time of arrival of the sensing devices 106a, 106b, 106c at the future location based on a distance to the future location and the speed of the sensing devices 106a, 106b, 106c. In FIG. 3, the future location arrival processor 324 receives the identification value associated with the future location from the future location frequency processor 304 in response to the future location being associated with a different geographic region and frequency band compared to the sensing devices 106a, 106b, 106c. In FIG. 3, the future location arrival processor 324 determines a low power mode interval to be implemented by the sensing devices 106a, 106b, 106c based on the time of arrival and/or the frequency band associated with the future location. For example, the future location arrival processor 324 can calculate a low power mode interval to be utilized by the devices in response to the future location frequency processor 304 indicating the identification value of the future location. In some examples, the future location arrival processor 324 transmits the identification value of the future location that the low power mode interval is based on to the future location frequency processor. As such, the future location arrival processor 324 ensures that the frequency band that the future location frequency processor 304 indicates to the transmitter 332 is associated with the same future location that the low power mode interval is associated with. Accordingly, the low power mode interval enables the sensing devices 106a, 106b, 106c to reactivate in advance of the time of arrival at the future location so the sensing devices 106a, 106b, 106c can adjust the frequency band utilized for communications prior to entering the different geographic region. In turn, the future location arrival processor 324 can determine a default low power mode to be implemented by the sensing devices 106a, 106b, 106c in response to the future location being in a same geographic region as the location of the sensing devices 106a, 106b, 106c.

In FIG. 3, the location interface 326 receives the location of the devices 106a, 106b, 106c indicated by the GPS/GNSS 306 periodically. In FIG. 3, the location interface 326 transmits the location of the sensing devices 106a, 106b, 106c to the speed processor 328 periodically (e.g., in response to receiving the location of the sensing devices 106a, 106b, 106c). In some examples, the location interface 326 receives the future location of the sensing devices 106a, 106b, 106c and the associated identification values indicated by the future location processor 310. In some examples, the location interface 326 receives the identification value(s) of the future location(s) of the sensing devices 106a, 106b, 106c that is/are associated with the different frequency band from the future location frequency processor 304. In FIG. 3, the location interface 326 transmits the future location of the sensing devices 106a, 106b, 106c to the arrival time processor 330. In FIG. 3, the location interface 326 transmits the identification value of the future location to the arrival time processor 330 in response to a geographic region and frequency band associated with the future location being different from that of the sensing devices 106a, 106b, 106c. In some examples, the location interface 326 provides an indication to the low power mode processor 331 in response to not receiving any future location(s) and/or identification values of the future location(s) from the future location frequency processor 304. In other words, the location interface 326 notifies the low power mode processor 331 in response to the future location(s) being associated with an identical geographic region and/or frequency band to that of the sensing devices 106a, 106b, 106c.

In FIG. 3, the speed processor 328 determines a speed of the sensing devices 106a, 106b, 106c based on a change in the location of the sensing devices 106a, 106b, 106c over a period of time. For example, the speed processor 328 can determine a distance that the sensing devices 106a, 106b, 106c travel over the period of time to determine the speed of the sensing devices 106a, 106b, 106c. In some examples, the speed processor 328 transmits the speed of the sensing devices 106a, 106b, 106c to the arrival time processor 330.

In FIG. 3, the arrival time processor 330 determines a time of arrival of the sensing devices 106a, 106b, 106c at the future location(s) associated with the different frequency band. For example, the arrival time processor 330 can determine the future location(s) associated with the different frequency band in response to receiving the identification value thereof via the location interface 326. Further, the arrival time processor 330 can determine the time of arrival of the sensing devices 106a, 106b, 106c at the future location(s) based on a distance to the future location and the speed of the sensing devices 106a, 106b, 106c. In some examples, the arrival time processor 330 indicates the time of arrival of the sensing devices 106a, 106b, 106c at the future location(s) associated with the different frequency band to the low power mode processor 331.

In FIG. 3, the low power mode processor 331 receives the time of arrival of the sensing devices 106a, 106b, 106c at the future location(s) (e.g., the first, second, third, fourth, fifth, sixth, seventh, eighth, and/or ninth future location) that is/are associated with the different geographic region and frequency band compared to the geographic region and frequency band associated with the location of the sensing devices 106a, 106b, 106c. In some examples, the low power mode processor 331 determines the future location nearest to the location of the sensing devices 106a, 106b, 106c based on the determined time of arrival of the sensing devices 106a, 106b, 106c at the future location(s) associated with the different frequency band. For example, the low power mode processor 331 identifies the nearest and/or quickest time of arrival transmitted by the arrival time processor 330. In some examples, the low power mode processor 331 indicates the nearest time of arrival to the transmitter 332.

In some examples, the low power mode processor 331 determines a low power mode interval based on the time of arrival of the sensing devices 106a, 106b, 106c at the nearest future location associated with the different frequency band. In FIG. 3, the low power mode interval enables the sensing devices 106a, 106b, 106c to reactivate in advance of the time of arrival at the nearest future location associated with the different frequency band. For example, the low power mode processor 331 determines a low power mode interval that enables the sensing devices 106a, 106b, 106c to reactivate a predetermined amount of time (e.g., 1 minute shorter, 3 minutes shorter, 5 minutes shorter, etc.) before the time of arrival of the sensing devices 106a, 106b, 106c at the future location. In other words, the low power mode processor 331 can subtract the predetermined amount of time from the time of arrival to determine the low power mode interval.

In some examples, the low power mode processor 331 determines that the sensing devices 106a, 106b, 106c are to utilize a default low power mode interval in response to the destination processor 302 and/or the future location arrival processor 324 not receiving the future location(s) from the future location frequency processor 304. For example, the low power mode processor 331 determines that the devices are to utilize the default low power mode in response to not receiving an arrival time of the sensing devices 106a, 106b, 106c at a future location. In other words, the low power mode processor 331 determines that the future location(s) are not associated with a different geographic region compared to the location of the sensing devices 106a, 106b, 106c and, thus, the sensing devices 106a, 106b, 106c are to utilize the default low power mode interval. In some examples, the default low power mode interval is a predetermined amount of time (e.g., 1 hour). In some examples, the low power mode processor 331 reduces the time associated with the default low power mode interval in response to utilizing the default low power mode interval consecutively. In other words, the low power mode processor 331 anticipates that the sensing devices 106a, 106b, 106c are approaching the different geographic region as more time goes by. In FIG. 3, the low power mode processor 331 indicates the default low power mode interval to the transmitter 332.

In FIG. 3, the transmitter 332 transmits the low power mode interval to the sensing devices 106a, 106b, 106c in response to receiving the low power mode interval via the destination processor 302. In FIG. 3, the transmitter 332 transmits the frequency band associated with the future location of the sensing devices 106a, 106b, 106c to the sensing devices 106a, 106b, 106c in response to receiving the frequency band via the future location frequency processor 304. For example, the transmitter 332 can transmit the frequency band associated with the different geographic region and frequency band to the sensing devices 106a, 106b, 106c. In some examples, the transmitter 332 transmits the frequency band in response to the sensing devices 106a, 106b, 106c establishing contact with the gateway 104. In such examples, the sensing devices 106a, 106b, 106c establish contact with the gateway in response to an expiration of the low power mode interval. In some examples, the transmitter 332 retransmits the frequency band and/or notifies an operator when the acknowledgement receipt is not received over a predetermined period of time after transmission of the frequency band.

In some examples, the transmitter 332 transmits the time of arrival at the nearest future location associated with the different frequency band to the sensing devices 106a, 106b, 106c. As a result, the sensing devices 106a, 106b, 106c can determine when to utilize the different frequency band based on a difference between an expiration of the low power mode interval and the time of arrival of the sensing devices 106a, 106b, 106c at the future location. In some examples, the sensing devices 106a, 106b, 106c utilize the frequency band based on a predetermined time difference between the time of arrival and the expiration of the low power mode interval.

Figure 4:
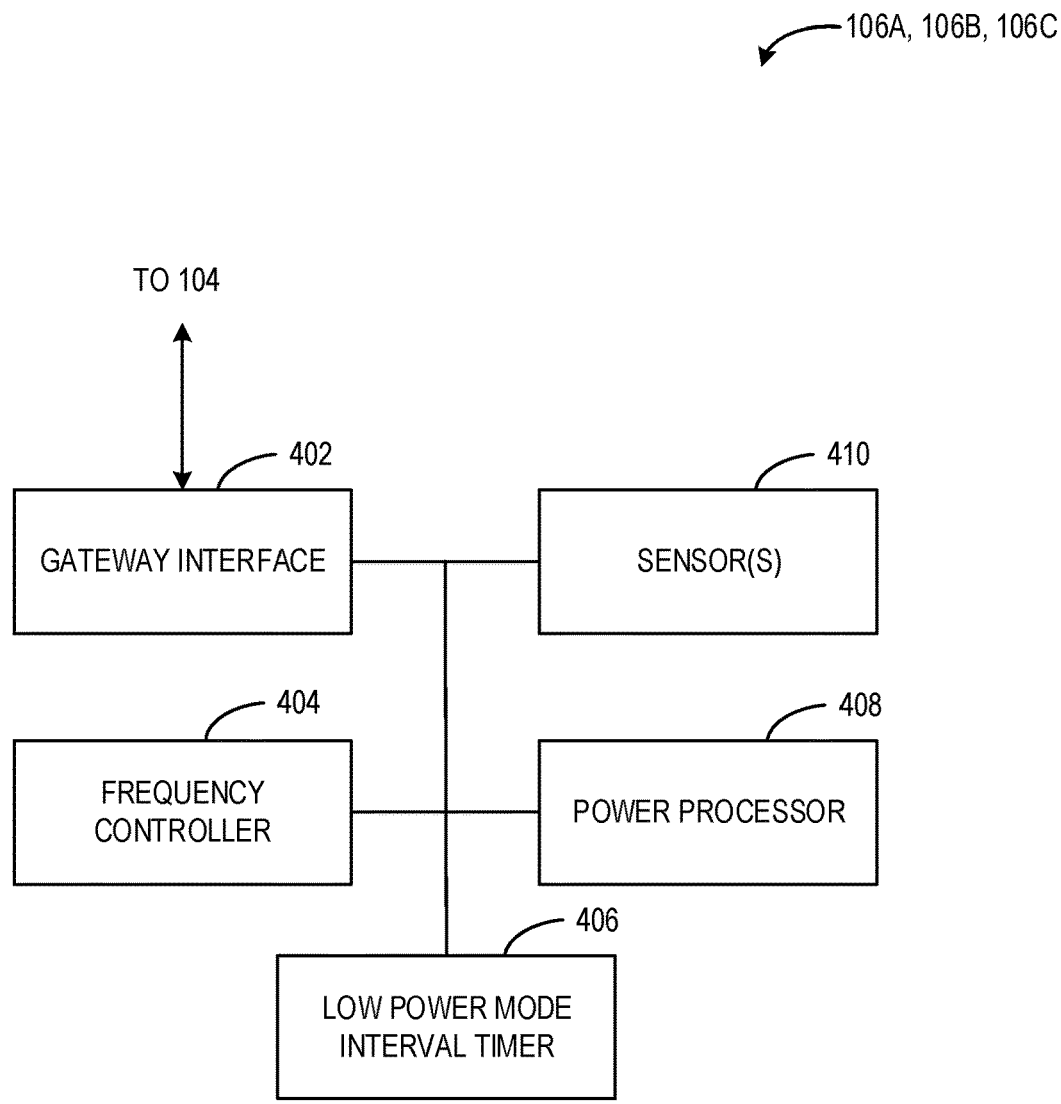
FIG. 4 is a block diagram of one of the example devices of FIG. 1.

FIG. 4 is a block diagram of the sensing devices 106a, 106b, 106c of FIG. 1. In FIG. 4, the sensing devices 106a, 106b, 106c include a gateway interface 402, a frequency controller 404, a low power mode interval timer 406, a power processor 408, and a sensor(s) 410. In some examples, the gateway interface 402, the frequency controller 404, the low power mode interval timer 406, the power processor 408, and the sensor(s) 410 are operatively coupled.

In FIG. 4, the gateway interface 402 transmits signals to, and/or receives signals from, the gateway 104. For example, the gateway interface 402 can receive data requests, communication adjustments (e.g., frequency band adjustments), and/or low power mode intervals from the gateway 104. In some examples, the gateway interface 402 extracts a reading of the sensor(s) 410 periodically and/or in response to receiving a data request from the gateway 104. In such examples, the gateway interface 402 transmits the reading of the sensor(s) 410 to the gateway 104 using a frequency band implemented and/or controlled by the frequency controller 404. In some examples, the gateway interface 402 transmits a signal corresponding to a frequency band adjustment to the frequency controller 404 in response to receiving the frequency band adjustment from the gateway 104. In such examples, the gateway interface 402 transmits a signal receipt acknowledgement in response to receiving the frequency band from the gateway 104. In FIG. 4, the gateway interface 402 transmits a signal to the low power mode timer 406 in response to receiving a low power mode interval from the gateway 104. In some examples, the gateway interface 402 establishes contact with the gateway 104 in response to an expiration of the low power mode interval.

In FIG. 4, the frequency controller 404 controls a frequency band that the gateway interface 402 utilizes for communications with the gateway 104. For example, the frequency controller 404 can implement the frequency band indicated by the gateway 104 in response to receiving the receiving the frequency band (e.g., the frequency band adjustment) via the gateway interface 402. As such, the sensing devices 106a, 106b, 106c can utilize a regional specific frequency band based on the location thereof to communicate with the gateway 104.

In some examples, the frequency controller 404 is configured to utilize and/or implement the frequency band a predetermined period of time after receipt of the frequency band and/or expiration of the low power mode interval. In such examples, the frequency controller 404 utilizes the frequency band in response to entering the associated geographic region. In some examples, the gateway 104 indicates a predetermined wait time when transmitting the frequency band to the sensing devices 106a, 106b, 106c. As a result, the frequency controller 404 can adjust the frequency band that the sensing devices 106a, 106b, 106c utilize to communicate with the gateway 104 after the predetermined wait time to ensure that the sensing devices 106a, 106b, 106c are in the geographic region associated with the frequency band.

In FIG. 4, the low power mode interval timer 406 implements a timer based on the received low power mode interval. In some examples, the gateway interface 402 provides a signal that indicates a low power mode interval and/or TWT to the low power mode interval timer 406 based on the low power mode interval received from the gateway 104. In some examples, the low power mode interval timer 406 activates in response to receiving the signal from the gateway interface 402. In some examples, the low power mode interval timer 406 deactivates in response to an expiration thereof (e.g., an expiration of the low power interval and/or TWT).

In FIG. 4, the power processor 408 controls a power usage of the device 106a, 106b, 106c. In some examples, the power processor 408 reduces the power usage of the sensing devices 106a, 106b, 106c and/or utilizes a low power mode in response to an activation of the low power mode interval timer 406. For example, the power processor 408 can minimize a power output of a battery (e.g., a coin cell battery) of the sensing devices 106a, 106b, 106c so that only the low power mode interval timer 406 receives power during the low power mode interval. As such, the power processor 408 preserves the battery to ensure that the sensing devices 106a, 106b, 106c maintain power throughout the logistics session 100. In some examples, the power processor 408 fully powers the sensing devices 106a, 106b, 106c in response to an expiration of the low power mode interval timer 406 and/or deactivation thereof.

In FIG. 4, the sensor(s) 410 detect a condition associated with assets and/or products aboard the transporter 102. For example, the sensor(s) 410 can include a thermometer, a humidity sensor, and/or any other sensor to determine the condition associated with the assets and/or products aboard the transporter 102. In some examples, the sensor(s) 410 initialize and/or begin taking measurements in response to the expiration of the low power mode interval timer 406 and/or being powered by the power processor 408.

Figure 5:
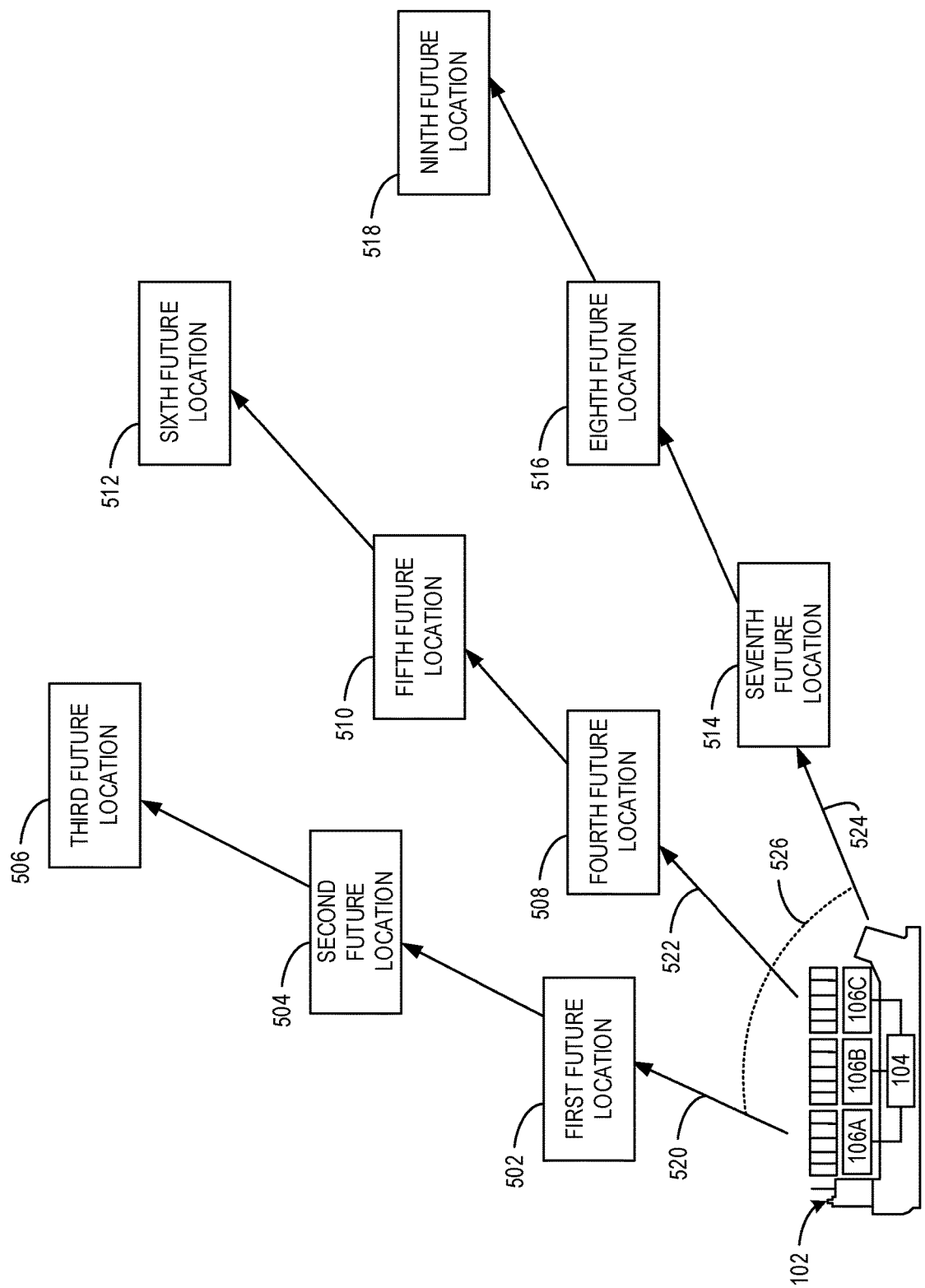
FIG. 5 illustrates example future locations of the example devices of FIGS. 1 and/or 4 determined by the example gateway of FIGS. 1, 2, and/or 3 in accordance with teachings disclosed herein.

FIG. 5 illustrates example future locations of the sensing devices 106a, 106b, 106c determined by the gateway 104. In FIG. 5, the transporter 102 includes the gateway 104, and the sensing devices 106a, 106b, 106c, along with assets that are being transported. In FIG. 5, the transporter 102 is illustrated as a ship. However, the transporter 102 may be any other means of transport, such as a train, a vehicle, an aircraft, etc. In FIG. 5, the gateway 104 determines a first future location 502, a second future location 504, a third future location 506, a fourth future location 508, a fifth future location 510, a sixth future location 512, a seventh future location 514, an eighth future location 516, and a ninth future location 518 of the sensing devices 106a, 106b, 106c. However, it should be understood that the gateway 104 can determine any number of future locations of the sensing devices 106a, 106b, 106c.

In FIG. 5, the first, second, and third future locations 502, 504, 506 are located along a first bearing 520 of the devices 106a, 106b, 106c and, thus, the transporter 102. In FIG. 5, the fourth, fifth, and sixth future locations 508, 510, 512 are located along a second bearing 522 of the sensing devices 106a, 106b, 106c. Further, the seventh, eighth, and ninth future locations 514, 516, 518 are located along a third bearing 524 of the sensing devices 106a, 106b, 106c. In FIG. 5, the first, second, and third bearing 520, 522, 524 are within a substantial bearing 526 of the sensing devices 106a, 106b, 106c and, thus, the transporter 102. As such, the first, second, and third bearings 520, 522, 524 can be anywhere between plus or minus 15 degrees of a bearing of the transporter 102. In some examples, the second bearing 522 is a bearing of the sensing devices 106a, 106b, 106c determined by the compass 308. In such examples, the first bearing 520 and the third bearing 524 are offset from the second bearing by a predetermined degree (e.g., 5 degrees, 10 degrees, 15 degrees, etc.) within the substantial bearing of the sensing devices 106a, 106b, 106c.

In FIG. 5, the gateway 104 determines the first future location 502 based on the first bearing 520 and a first distance (e.g., 5 nautical miles, 10 nautical miles, 15 nautical miles, etc.) from the location of the sensing devices 106a, 106b, 106c. In FIG. 5, the gateway 104 determines the second future location 504 based on the first bearing 520 and a second distance (e.g., 20 nautical miles, 30 nautical miles, 40 nautical miles, etc.) from the location of the devices 106a, 106b, 106c. In FIG. 5, the gateway 104 determines the third future location 506 based on the first bearing 520 and a third distance (e.g., 50 nautical miles, 75 nautical miles, 100 nautical miles, etc.) from the location of the sensing devices 106a, 106b, 106c.

In FIG. 5, the gateway 104 determines the fourth future location 508 based on the second bearing 522 and the first distance from the location of the devices 106a, 106b, 106c. In FIG. 5, the gateway 104 determines the fifth future location 510 based on the second bearing 522 and the second distance from the location of the devices 106a, 106b, 106c. In FIG. 5, the gateway 104 determines the sixth future location based on the second bearing 522 and the third distance from the location of the sensing devices 106a, 106b, 106c.

In FIG. 5, the gateway 104 determines the seventh future location 514 based on the third bearing 524 and the first distance from the location of the sensing devices 106a, 106b, 106c. In some examples, the gateway 104 determines the eighth future location 516 based on the third bearing 524 and the second distance from the location of the sensing devices 106a, 106b, 106c. In some examples, the gateway 104 determines the ninth future location 518 based on the third bearing 524 and the third distance from the location of the sensing devices 106a, 106b, 106c.

In FIG. 5, the third distance is greater than the second distance, which is greater than the first distance. In some examples, the first, second, and third distance are randomly selected by the gateway 104. In some examples, the first, second, and third distances are specified by an operator of the gateway 104 based on characteristics of the logistics session 100.

In FIG. 5, the gateway 104 determines a geographic region(s) associated with the first future location 502, the second future location 504, the third future location 506, the fourth future location 508, the fifth future location 510, the sixth future location 512, the seventh future location 514, the eighth future location 516, and/or the ninth future location 518. In some examples, the gateway 104 compares the geographic region(s) associated with the future locations 502, 504, 506, 508, 510, 512, 514, 516, 518 to a geographic region associated with the location of the sensing devices 106a, 106b, 106c.

In some examples, the gateway 104 determines a frequency band(s) associated with the geographic region(s) of the future locations 502, 504, 506, 508, 510, 512, 514, 516, 518. For example, the gateway 104 can determine the frequency band(s) associated with the geographic region(s) of the future locations 502, 504, 506, 508, 510, 512, 514, 516, 518 in response to the geographic region of the respective future locations 502, 504, 506, 508, 510, 512, 514, 516, 518 being different from the geographic region of the sensing devices 106a, 106b, 106c. In some other examples, the gateway 104 compares the frequency band(s) associated with the geographic region(s) of the future locations 502, 504, 506, 508, 510, 512, 514, 516, 518 to a frequency band being utilized by the sensing devices 106a, 106b, 106c. In such examples, the gateway 104 determines the future location 502, 504, 506, 508, 510, 512, 514, 516, 518 is in a different geographic region compared to the sensing devices 106a, 106b, 106c in response to the frequency band(s) being different from the frequency band being utilized by the sensing devices 106a, 106b, 106c.

In FIG. 5, the gateway 104 determines a time(s) of arrival of the devices 106a, 106b, 106c at the first future location 502, the second future location 504, the third future location 506, the fourth future location 508, the fifth future location 510, the sixth future location 512, the seventh future location 514, the eighth future location 516, and/or the ninth future location 518 in response to the future location 502, 504, 506, 508, 510, 512, 514, 516, 518 being located outside the geographic region associated with the location of the sensing devices 106a, 106b, 106c. In some examples, the gateway 104 determines the time(s) of arrival of the sensing devices 106a, 106b, 106c at the future location 502, 504, 506, 508, 510, 512, 514, 516, 518 based on a speed of the transporter 102. In some examples, the gateway 104 determines the quickest time of arrival (e.g., a time of arrival closest to the current time and/or the time of the determination) at the future location(s) 502, 504, 506, 508, 510, 512, 514, 516, 518 of the sensing devices 106a, 106b, 106c based on the determined time(s) of arrival. In some examples, the gateway 104 extracts the frequency band associated with the geographic region of the future location 502, 504, 506, 508, 510, 512, 514, 516, 518 associated with the quickest time of arrival.

In FIG. 5, the gateway 104 transmits a low power mode interval to the sensing devices 106a, 106b, 106c based on the quickest time of arrival. In other words, the gateway 104 transmits the low power mode interval to the devices based on the time of arrival at a closest future location associated with a different geographic region and, thus, a different frequency band compared to the sensing devices 106a, 106b, 106c. In some examples, the low power mode interval enables the sensing devices 106a, 106b, 106c to reactivate in advance of the quickest time of arrival. For example, the low power mode interval can enable the sensing devices 106a, 106b, 106c to reactivate a predetermined amount of time prior to the quickest time of arrival. In some examples, the gateway 104 transmits a default low power mode interval to the sensing devices 106a, 106b, 106c in response to the future locations 502, 504, 506, 508, 510, 512, 514, 516, 518 being located within the same geographic region as the sensing devices 106a, 106b, 106c and, thus, being associated with the same frequency band as the sensing devices 106a, 106b, 106c.

In FIG. 5, the gateway 104 transmits the frequency band associated with the future location 502, 504, 506, 508, 510, 512, 514, 516, 518 linked to the quickest time of arrival to the sensing devices 106a, 106b, 106c in response to an expiration of the low power mode interval. Accordingly, the sensing devices 106a, 106b, 106c can utilize the frequency band to communicate with the gateway 104 upon entering the different geographic region. In some examples, the sensing devices 106a, 106b, 106c establish contact with the gateway 104 in response to an expiration of the low power mode interval. In such examples, the gateway 104 transmits the frequency band associated with the future location 502, 504, 506, 508, 510, 512, 514, 516, 518 to the sensing devices 106a, 106b, 106c in response to receiving contact from the sensing devices 106a, 106b, 106c. In some examples, the sensing devices 106a, 106b, 106c implement the frequency band associated with the future location 502, 504, 506, 508, 510, 512, 514, 516, 518 based on the predetermined amount of time between the expiration of the low power mode interval and the time of arrival at the future location 502, 504, 506, 508, 510, 512, 514, 516, 518.

In some examples, the sensing devices 106a, 106b, 106c establish contact with the gateway 104 in response to an expiration of the default low power mode interval. In such examples, the gateway 104 redetermines future locations (e.g., the future locations 502, 504, 506, 508, 510, 512, 514, 516, 518) of the sensing devices 106a, 106b, 106c. In some examples, the gateway 104 redetermines the future locations of the sensing devices 106a, 106b, 106c in response to the transporter 102 not yet arriving at a destination.

While an example manner of implementing the gateway 104 of FIGS. 1, 2, 3, and/or 5 is illustrated in FIGS. 2 and/or 3, one or more of the elements, processes and/or devices illustrated in FIGS. 2 and/or 3 may be combined, divided, re-arranged, omitted, eliminated and/or implemented in any other way. Further, the example geographic frequency band processor 202, the example device data processor 204, the example data manager 206, the example device interface 208, the example device database 209, the example device data correlator 210, the example communication interface 212, the example asset condition database 214, the example timer 216, the example protocol determiner 218, the example data comparator 220, the example operation adjuster 222, the example destination processor 302, the example future location frequency processor 304, the example GPS/GNSS 306, the example compass 308, the example future location processor 310, the example communication interface 312, the example offline map database 314, the example geographic boundary database 316, the example geographic frequency band database 318, the example future location region identifier 320, the example device region comparator 322, the example future location arrival processor 324, the example location interface 326, the example speed processor 328, the example arrival time processor 330, the example low power mode processor 331, the example transmitter 332 and/or, more generally, the example gateway 104 of FIGS. 1, 2, 3, and/or 5 may be implemented by hardware, software, firmware and/or any combination of hardware, software and/or firmware. Thus, for example, any of the example geographic frequency band processor 202, the example device data processor 204, the example data manager 206, the example device interface 208, the example device database 209, the example device data correlator 210, the example communication interface 212, the example asset condition database 214, the example timer 216, the example protocol determiner 218, the example data comparator 220, the example operation adjuster 222, the example destination processor 302, the example future location frequency processor 304, the example GPS/GNSS 306, the example compass 308, the example future location processor 310, the example communication interface 312, the example offline map database 314, the example geographic boundary database 316, the example geographic frequency band database 318, the example future location region identifier 320, the example device region comparator 322, the example future location arrival processor 324, the example location interface 326, the example speed processor 328, the example arrival time processor 330, the example low power mode processor 331, the example transmitter 332 and/or, more generally, the example gateway 104 of FIGS. 1, 2, 3, and/or 5 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example geographic frequency band processor 202, the example device data processor 204, the example data manager 206, the example device interface 208, the example device database 209, the example device data correlator 210, the example communication interface 212, the example asset condition database 214, the example timer 216, the example protocol determiner 218, the example data comparator 220, the example operation adjuster 222, the example destination processor 302, the example future location frequency processor 304, the example GPS/GNSS 306, the example compass 308, the example future location processor 310, the example communication interface 312, the example offline map database 314, the example geographic boundary database 316, the example geographic frequency band database 318, the example future location region identifier 320, the example device region comparator 322, the example future location arrival processor 324, the example location interface 326, the example speed processor 328, the example arrival time processor 330, the example low power mode processor 331, the example transmitter 332 and/or, more generally, the example gateway 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example gateway 104 of FIGS. 1, 2, 3 and/or 5 may include one or more elements, processes and/or devices in addition to, or instead of, those illustrated in FIGS. 2 and/or 3, and/or may include more than one of any or all of the illustrated elements, processes, and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 6:
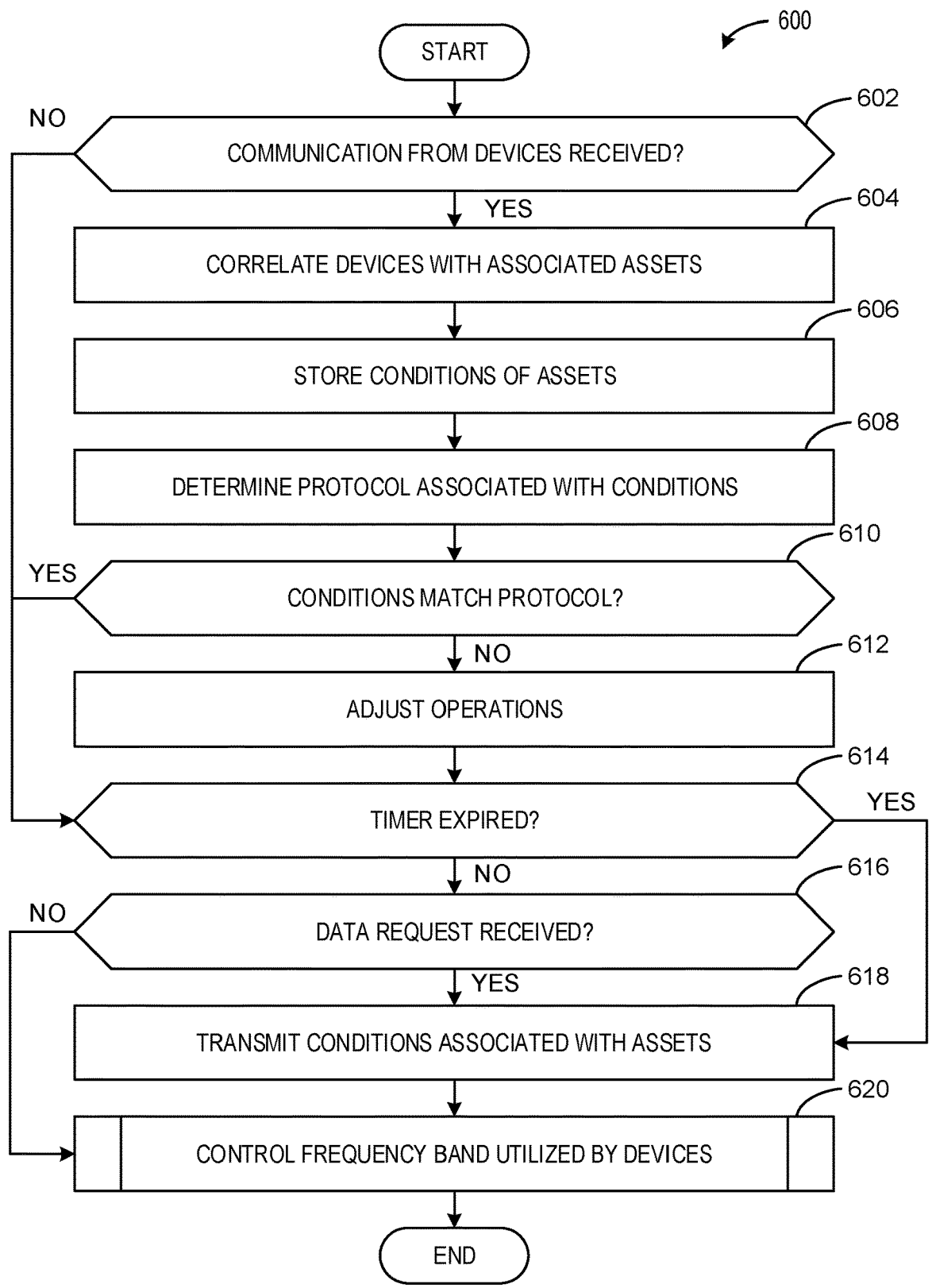
FIG. 6 is a flowchart representative of computer readable instructions which may be executed to implement the example gateway 104 of FIGS. 1, 2, 3, and/or 5.
Figure 7:
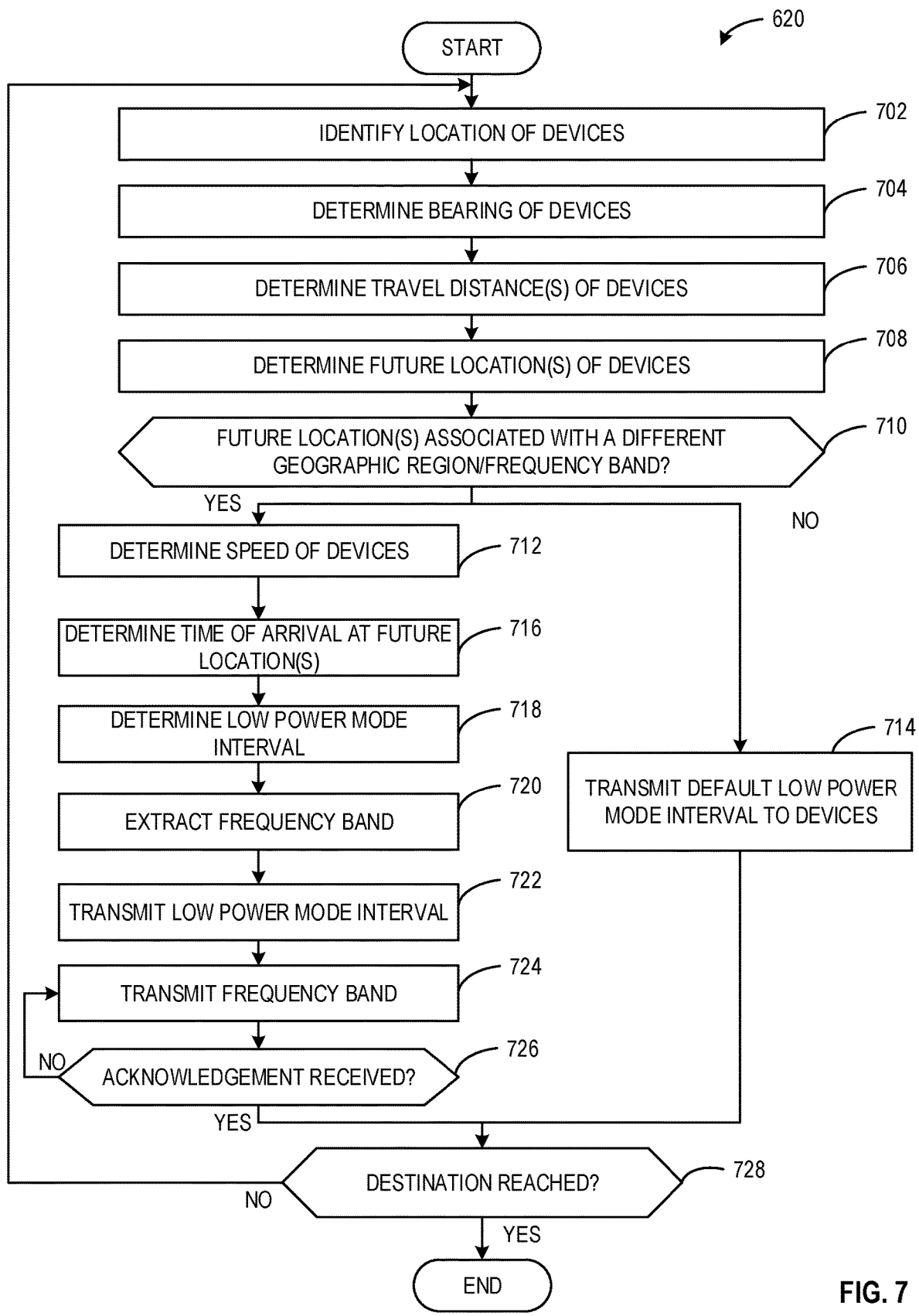
FIG. 7 is a flowchart representative of computer readable instructions which may be executed to implement an example geographic frequency band processor of the example gateway of FIGS. 1, 2, 3, and/or 5.

A flowchart representative of example hardware logic, machine readable instructions, hardware implemented state machines, and/or any combination thereof for implementing the example gateway 104 of FIGS. 1, 2, 3, and/or 5 is shown in FIGS. 6, 7, and/or 8. The machine readable instructions may be one or more executable programs or portion(s) of an executable program for execution by a computer processor and/or processor circuitry, such as the processor 1012 shown in the example processor platform 1000 discussed below in connection with FIG. 10. The program may be embodied in software stored on a non-transitory computer readable storage media such as a CD-ROM, a floppy disk, a hard drive, a DVD, a Blu-ray disk, or a memory associated with the processor 1012, but the entire program and/or parts thereof could alternatively be executed by a device other than the processor 1012 and/or embodied in firmware or dedicated hardware. Further, although the example program is described with reference to the flowchart illustrated in FIGS. 6, 7, and/or 8, many other methods of implementing the example gateway 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 6, 7, and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 6 is a flowchart representative of computer readable instructions 600 which may be executed to implement the example gateway 104 of FIGS. 1, 2, 3, and/or 5. At block 602, the gateway 104 determines whether communications have been received from the sensing devices 106a, 106b, 106c. For example, the device data processor 204 can determine whether a signal has been received from the sensing devices 106a, 106b, 106c. In some examples, the device interface 208 receives the signal from the sensing devices 106a, 106b, 106c. In some examples, in response to not receiving communications from the sensing devices 106a, 106b, 106c the computer readable instructions proceed to block 612.

At block 604, the gateway 104 correlates the sensing devices 106a, 106b, 106c that the communications were received from with the assets associated with the sensing devices 106a, 106b, 106c. For example, the device correlator 210 can correlate the sensing devices 106a, 106b, 106c with the associated assets via the device database 209. In some examples, the device data correlator 210 indicates the conditions of the assets to the data manager 206. In some examples, the communication interface 212 of the data manager 206 receives the conditions of the assets.

At block 606, the gateway stores the conditions associated with the assets. For example, the communication interface 212 of the data manager 206 can receive the conditions of the assets. Further, the communication interface 212 can store the conditions of the assets via the asset condition database 214. In some examples, the communication interface 212 transmits the conditions of the assets to the data comparator 220 of the data manager 206.

At block 608, the gateway 104 determines a protocol associated with the conditions of the assets. For example, the protocol determiner 218 determines a predetermined temperature range, a predetermined humidity range, and/or any other predetermined condition associated the assets. In some examples, the protocol determiner transmits the protocol associated with the conditions of the assets to the data comparator 220.

At block 610, the gateway 104 determines whether the conditions of the assets match the associated protocol. For example, the data comparator 220 compares a humidity of the assets to a predetermined humidity associated with the assets to determine whether the conditions of the assets match the protocol. In some examples, the data comparator 220 determines the conditions of the assets via the asset condition database 214. In some examples, the data comparator 220 transmits the results of the comparison to the operation adjuster 22, which determines whether to make an adjustment to the conditions associated with the assets. In some example, the computer readable instructions proceed to block 614 in response to the conditions of the assets matching the associated protocol.

At block 612, the gateway 104 adjusts operations (e.g., conditions of the assets) in response to the conditions of the assets not matching the associated protocol. For example, the operation adjuster 222 can increase or decrease a humidity in a freight containing the assets in response to the humidity sensed by the sensing devices 106a, 106b, 106c being higher or lower than the predetermined humidity associated with the assets. In some examples, the operation adjuster 222 provides a notification to an operator indicating the condition adjustment.

At block 614, the gateway determines whether the timer 216 has expired (e.g., ran out of time, displays 0.0, etc.). For example, the timer 216 can provide a notification to the communication interface 212 in response to an expiration of the associated time. In some examples, the computer readable instructions 600 proceed to block 618 in response to the timer 216 expiring.

At block 616, the gateway 104 determines whether a data request has been received from the backend server 112 of FIG. 1. For example, the communication interface 212 can receive the data request from the backend server 112. In some examples, the computer readable instructions proceed to block 620 in response to the communication interface 212 not receiving the data request.

At block 618, the gateway 104 transmits the conditions associated with the assets to the backend server 112. For example, the communication interface 212 can transmit the data in the asset condition database 214 to the backend server 112 via wireless cellular communications, Wi-Fi, Bluetooth, satellite, and/or any other wireless communication protocol.

At block 620, the gateway 104 controls a frequency band utilized by the sensing devices 106a, 106b, 106c. For example, the geographic frequency band processor 202 can control the frequency band utilized by the sensing devices 106a, 106b, 106c to communicate with the gateway 104, as discussed further in association with FIG. 7.

FIG. 7 is a flowchart representative of machine readable instructions 620 which may be executed to implement the example geographic frequency band processor 202 of the example gateway 104 of FIGS. 1, 2, 3, and/or 5. At block 702, the geographic frequency band processor 202 of FIGS. 2 and/or 3 identifies a location of the sensing devices 106a, 106b, 106c of FIGS. 1, 4, and/or 5. For example, the GPS/GNSS 306 of the destination processor 302 of FIG. 3 can identify the location of the sensing devices 106a, 106b, 106c. In some examples, the future location processor 310 of the destination processor 302 extracts the location of the sensing devices 106a, 106b, 106c from the GPS/GNSS 306. In some examples, the future location arrival processor 324 of the destination processor 302 periodically extracts the location of the sensing devices 106a, 106b, 106c from the GPS/GNSS 306. In some examples, the destination processor 302 transmits the location of the sensing devices 106a, 106b, 106c to the future location frequency processor 304.

At block 704, the geographic frequency band processor 202 determines a bearing of the sensing devices 106a, 106b, 106c. For example, the compass 308 of the destination processor 302 can determine the bearing of the transporter 102 and, thus, the sensing devices 106a, 106b, 106c (e.g., the second bearing 522). In some examples, the future location processor 310 extracts the bearing of the sensing devices 106a, 106b, 106c from the compass 308. In such examples, the future location processor 310 determines a substantial bearing of the sensing devices 106a, 106b, 106c (e.g., the substantial bearing 526) based on the bearing determined by the compass 308. In some other examples, the compass 308 determines the substantial bearing of the sensing devices 106a, 106b, 106c.

At block 706, the geographic frequency band processor 202 determines a travel distance(s) of the sensing devices 106a, 106b, 106c. For example, the future location processor 310 can determine the travel distance(s) of the sensing devices 106a, 106b, 106c. In some examples, the future location processor 310 determines the travel distance(s) of the sensing devices 106a, 106b, 106c randomly. In some other examples, the travel distance(s) to be utilized by the future location processor 310 are specified during an initialization of the geographic frequency band processor 202 and/or the gateway 104.

At block 708, the geographic frequency band processor 202 determines a future location(s) of the sensing devices 106a, 106b, 106c (e.g., the first, second, third, fourth, fifth, sixth, seventh, eighth, and/or ninth future locations 502, 504, 506, 508, 510, 512, 514, 516, 518). For example, the future location processor 310 can determine the future location(s) of the sensing devices 106a, 106b, 106c based on the location of the sensing devices 106a, 106b, 106c, the substantial bearing of the sensing devices 106a, 106b, 106c, and the travel distance(s) of the sensing devices 106a, 106b, 106c. In some examples, the future location processor 310 transmits the future location(s) of the sensing devices 106a, 106b, 106c to the future location arrival processor 324. In some examples, the destination processor 302 transmits the future location(s) of the devices 106a, 106b, 106c to the future location frequency processor 304.

At block 710, the geographic frequency band processor 202 determines whether the future location(s) of the sensing devices 106a, 106b, 106c are associated with a different geographic region compared to a geographic region associated with the location of the sensing devices 106a, 106b, 106c. For example, the future location region identifier 320 identifies a geographic region associated with the future location(s) via the offline map database 314 and/or the geographic boundary database 316. In some examples, the future location region identifier 320 transmits the geographic region associated with the future location(s) to the device region comparator 322. In such examples, the device region comparator 322 determines the geographic region associated with the location of the sensing devices 106a, 106b, 106c via the offline map database 314 and/or the geographic boundary database 316. Accordingly, the device region comparator 322 can compare the geographic region associated with the future location(s) to the geographic region associated with the location of the sensing devices 106a, 106b, 106c to determine whether the future location(s) are located within a different geographic region compared to the sensing devices 106a, 106b, 106c. In some examples, the computer readable instructions 620 proceed to block 712 in response to the future location(s) being associated with the different geographic region compared to the sensing devices 106a, 106b, 106c. In some examples, the computer readable instructions 620 proceed to block 714 in response to the future location(s) being associated with an identical geographic region to that of the sensing devices 106a, 106b, 106c.

In some examples, the communication interface 312 receives the frequency band associated with the sensing devices 106a, 106b, 106c from the device data processor 204 of the gateway 104 in response to the device data processor 204 receiving communications from the sensing devices 106a, 106b, 106c. In such examples, the communication interface 312 transmits the frequency band associated with the sensing devices 106a, 106b, 106c to the device region comparator 322. Further, the device region comparator 322 can determine the frequency band associated with the geographic region of the future location(s). Accordingly, the device region comparator 322 can compare the frequency band of the sensing devices 106a, 106b, 106c to the frequency band of the future locations to determine whether the future location(s) is/are associated with a different frequency band compared to the frequency band being utilized by the sensing devices 106a, 106b, 106c.

In some examples, the future location frequency processor 304 transmits an identification value of the future location(s) to the destination processor 302 in response to the future location(s) being associated with the different geographic region and/or frequency band. In such examples, the computer readable instructions 620 continue to block 712. In some other examples, the future location frequency processor 304 indicates that the future location(s) are associated with the same geographic region and/or frequency band as the sensing devices 106a, 106b, 106c to the destination processor 302. In such examples, the computer readable instructions 620 continue to block 714.

At block 712, the geographic frequency band processor 202 determines a speed of the sensing devices 106a, 106b, 106c. For example, the speed processor 328 determines the speed of the sensing devices 106a, 106b, 106c based on the location of the sensing devices 106a, 106b, 106c received periodically. In some examples, the location interface 326 transmits the location of the sensing devices 106a, 106b, 106c to the speed processor 328 periodically. In such examples, the speed processor 328 determines the speed of the sensing devices 106a, 106b, 106c based on a distance traveled by the sensing devices 106a, 106b, 106c over a period of time. In some examples, the speed processor 328 transmits the speed of the sensing devices 106a, 106b, 106c to the arrival time processor 330.

At block 714, the geographic frequency band processor 202 of the gateway 104 transmits a default low power mode interval to the sensing devices 106a, 106b, 106c. For example, the low power mode processor 331 can determine that the sensing devices 106a, 106b, 106c are to implement the default low power mode interval in response to the future location frequency processor 304 indicating that the future location(s) are in the same geographic region as the sensing devices 106a, 106b, 106c. Specifically, the location interface 326 notifies the low power mode processor 331 in response to the future location(s) being associated with the same geographic region and frequency band as the sensing devices 106a, 106b, 106c. In some examples, the destination processor 302 indicates the default low power mode interval to the transmitter 332. In such examples, the transmitter 332 transmits the default low power mode interval to the sensing devices 106a, 106b, 106c.

At block 716, the geographic frequency band processor 202 determines a time of arrival at the future location(s) of the sensing devices 106a, 106b, 106c. For example, the arrival time processor 330 can determine a time of arrival of the sensing devices 106a, 106b, 106c at the future location(s) associated with the different geographic region based on the speed of the sensing devices 106a, 106b, 106c and a distance to the future location(s). In some examples, the arrival time processor 330 transmits the time of arrival of the sensing devices 106a, 106b, 106c at the future location(s) associated with the different geographic region to the low power mode processor 331.

At block 718, the geographic frequency band processor 202 of the gateway 104 determines a low power mode interval to be implemented by the sensing devices 106a, 106b, 106c. For example, the low power mode processor 331 determines the low power mode interval based on the time of arrival of the sensing devices 106a, 106b, 106c at the nearest future location associated with the different geographic region. In some examples, the low power mode processor 331 determines the nearest and/or quickest time of arrival transmitted by the arrival time processor 330. In such examples, the low power mode processor 331 configures the low power mode interval to reactivate the sensing devices 106a, 106b, 106c a predetermined amount of time in advance of the time of arrival of the sensing devices 106a, 106b, 106c at the future location. In some examples, the destination processor 302 transmits the low power mode interval to the transmitter 332. In some examples, the destination processor 302 transmits the nearest time of arrival or a time difference between the nearest time of arrival and an end of the low power mode interval to the transmitter 332.

At block 720, the geographic frequency band processor 202 extracts a frequency band associated with the future location(s). For example, the device region comparator 322 can extract the frequency band based on the geographic region of the future location(s) via the geographic frequency band database 318. In some examples, the future location frequency processor 304 indicates the frequency band to the transmitter 332.

At block 722, the geographic frequency band processor 202 transmits the low power mode interval to the sensing devices 106a, 106b, 106c. For example, the transmitter 332 can transmit the low power mode interval to the sensing devices 106a, 106b, 106c. In some examples, the transmitter 332 transmits the time difference between the end of the low power mode interval and the time of arrival to the sensing devices 106a, 106b, 106c.

At block 724, the geographic frequency band processor 202 of the gateway 104 transmits the frequency band associated with the future location to the sensing devices 106a, 106b, 106c. For example, the transmitter 332 can transmit the frequency band associated with the future location to the sensing devices 106a, 106b, 106c. In some examples, the transmitter 332 transmits the frequency band in response to the sensing devices 106a, 106b, 106c reactivating after the low power mode interval. In such examples, the sensing devices 106a, 106b, 106c establish contact with the device data processor 204 of FIG. 2 in response to reactivation. Further, the device data processor 204 can indicate the reactivation of the sensing devices 106a, 106b, 106c to the future location frequency processor 304 in response to the sensing devices 106a, 106b, 106c establishing contact with the gateway 104. In some examples, the future location frequency processor 304 notifies the transmitter 332 of the reactivation of the sensing devices 106a, 106b, 106c, which causes the transmitter 332 to transmit the frequency band associated with the future location to the sensing devices 106a, 106b, 106c.

At block 726, the geographic frequency band processor 202 determines whether an acknowledgement indicating reception of the frequency band has been received from the sensing devices 106a, 106b, 106c. For example, the communication interface 312 can receive acknowledgement receipts indicating a frequency band received by the sensing devices 106a, 106b, 106c via the device data processor 204. In some examples, the future location frequency processor 304 provides an indication to the transmitter 332 in response to receiving the acknowledgement receipt. In such examples, the machine readable instructions continue to block 728 in response to receiving the acknowledgement receipt. In some other examples, the machine readable instructions return to block 724 in response to the geographic frequency band processor 202 not receiving the acknowledgement receipt.

At block 728, the geographic frequency band processor 202 determines whether a destination of the logistics session 100 has been reached. For example, the future location arrival processor 324 can determine that the transporter 102 has arrived at the destination location 110 in response to the GPS/GNSS 306 indicating the destination location. For example, the location interface 326 can determine whether the destination location has been reached by comparing the location indicated by the GPS/GNSS 306 to a predetermined destination location. In some examples, the computer readable instructions 620 return to block 702 in response to the transporter 102 not arriving at the destination location 110.

Figure 8:
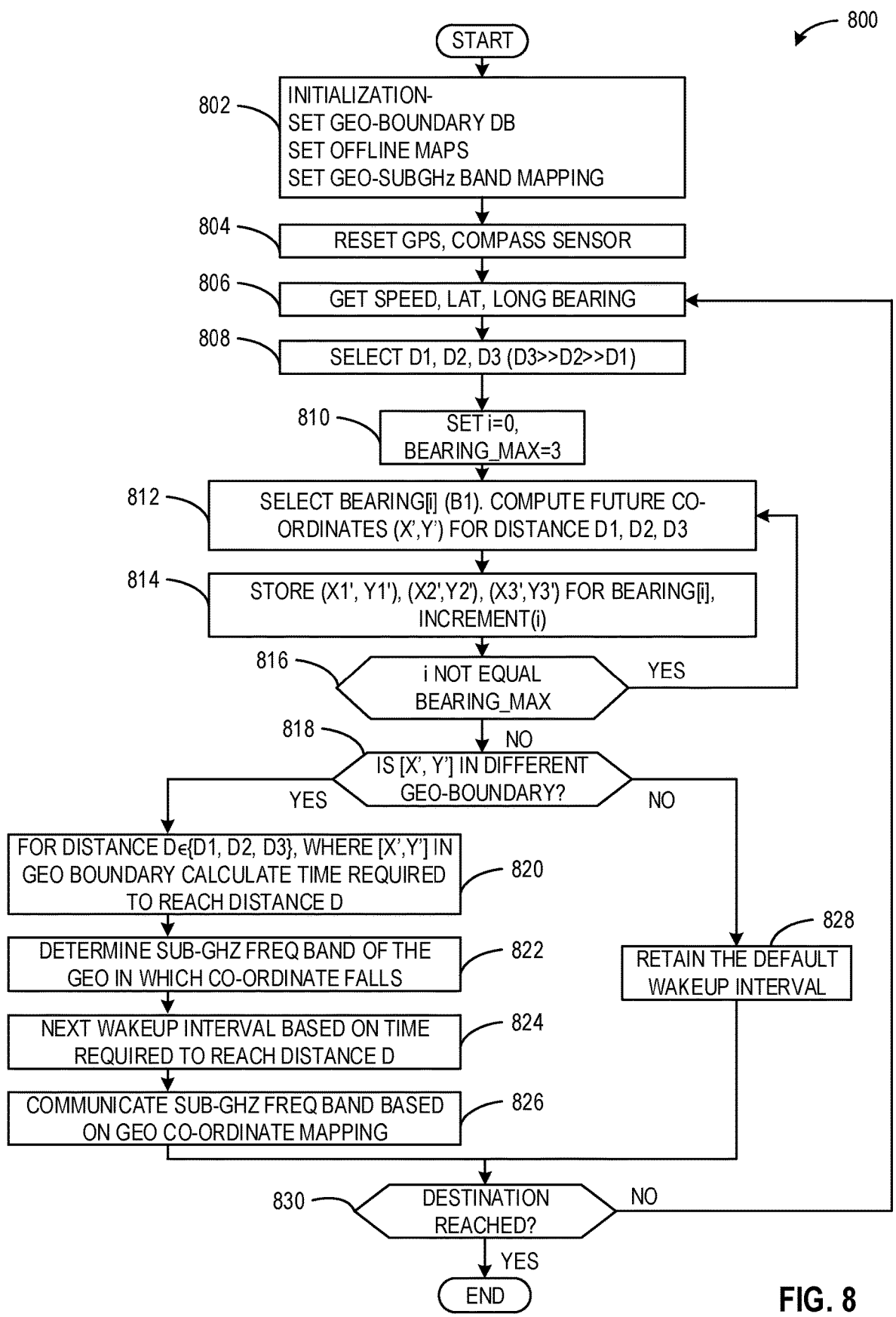
FIG. 8 is a flowchart representative of second example computer readable instructions which may be executed to implement the example geographic frequency band processor of the example gateway of FIGS. 1, 2, 3, and/or 5.

FIG. 8 is an example implementation of the flowchart of FIG. 7 representative of computer readable instructions 800 which may be executed to implement the example gateway of FIGS. 1, 2, 3, 4, and/or 5. At block 802, the gateway 104 initializes the geographic frequency band processor 202. For example, the gateway 104 can download the offline map database (e.g., offline maps) 314, the geographic boundary database 316, and the geographic frequency band database (e.g., geographic sub-GHz band mapping) 318 via the backend server 112. Further, the gateway 104 can set and/or upload the offline map database 314, the geographic boundary database 316, and the geographic frequency band database 318 to the geographic frequency band processor 202. In some examples, the future location frequency processor 304 downloads the databases 312, 314, 316.

At block 804, the gateway 104 resets the GPS/GNSS 306 and/or compass sensor 308. For example, destination processor 302 resets and/or activates the GPS/GNSS 306 and the compass 308. In such examples, the GPS/GNSS 306 and the compass 308 being monitoring the location and bearing of the transporter 102.

At block 806, the gateway 104 obtains the speed of the transporter 102, the latitude and longitude of the transporter 102, and the bearing of the transporter 102. For example, the gateway 104 can obtain the latitude and longitude of the transporter 102 via the GPS/GNSS 306. Further, the gateway 104 can obtain the bearing and/or the substantial bearing of the transporter 102 via the compass 308. Furthermore, the gateway 104 can obtain the speed of the transporter 102 via the speed processor 328.

At block 808, the gateway 104 selects a first, second, and third distance to be utilized in determining the future location of the transporter 102. For example, the future location processor 310 can select the first, second, and third distance randomly and/or based on predetermined distances. In some examples, the third distance is greater than the second distance, which is greater than the first distance.

At block 810, the gateway 104 sets a quantity of bearings to be utilized when determining the future locations of the transporter 102. For example, the future location processor 310 can determine the quantity of bearings to be considered. In some examples, the bearings are within the substantial bearing of the transporter 102.

At block 812, the gateway 104 selects a bearing within the substantial bearing of the transporter 102. Accordingly, the gateway 104 computes future coordinates of the transporter 102 based on the selected bearing and the first, second, and third distances. For example, the future location processor 310 can determine the future coordinates of the transporter 102 based on the selected bearing and the first, second, and third distances relative to the location of the transporter 102.

At block 814, the gateway 104 stores a first, second, and third future coordinate of the transporter 102 based on the selected bearing and the first, second, and third distances. For example, the destination processor 302 transmits the future coordinates to the future location frequency processor 304. Further, the communication interface 312 can store the future coordinates via the offline map database 314 and/or the geographic boundary database 316.

At block 816, the gateway 104 determines whether future coordinates have been obtained for the determined quantity of bearings. For example, the future location processor 310 can determine a quantity of bearings for which future coordinates have been obtained. Further, the future location processor 310 can compare the quantity of bearings for which future coordinates have been obtained to the total quantity of bearings to be considered. In some examples, the computer readable instructions 800 return to block 812 in response the quantity of bearings for which future coordinates have been obtained being less than the total quantity of bearings to be considered.

At block 818, the gateway 104 determines whether the determined future coordinates are in a different geographic boundary compared to the location of the transporter 102. For example, the future location region identifier 320 can identify a geographic region(s) associated with the future coordinates via the offline map database 314 and/or the geographic boundary database 316. Further, the device region comparator 322 can compare the geographic region(s) associated with the future coordinates to the geographic region associated with the location of the transporter 102. In some examples, the computer readable instructions 800 continue to block 820 in response to at least one of the determined future coordinates being in the different geographic boundary. In some other examples, the computer readable instructions 800 continue to block 828 in response to the determined future coordinates being in a same geographic boundary as the transporter 102.

At block 820, the gateway 104 calculates a time required to travel a distance between the coordinates of the transporter 102 and the future coordinates of the transporter 102 in the different geographic boundary. For example, the arrival time processor 330 can calculate the time required to reach the future coordinates based on the speed of the transporter 102 and the distance between the coordinates of the transporter 102 and the future coordinates in the different geographic boundary.

At block 822, the gateway 104 determines a sub-GHz frequency band associated with the geographic region in which the future coordinates of the transporter 102 are located. For example, the device region comparator 322 can determine the sub-GHz frequency band based on the geographic region via the geographic frequency band database 318. In some examples, the future location frequency processor 304 transmits the sub-GHz frequency band associated with the future coordinates to the transmitter 332.

At block 724, the gateway 104 can determine the next wakeup interval (e.g., the low power mode interval, the TWT, etc.) to be utilized by the sensing devices 106a, 106b, 106c aboard the transporter 102 based on the time required to travel the distance between the coordinates of the transporter 102 and the coordinates of the future location. For example, the low power mode processor 331 can determine the next wakeup interval to be a predetermined amount of time less than the time required to travel from the coordinates of the transporter 102 to the coordinates of the future location. In some examples, the transmitter 332 transmits the next wakeup interval to the sensing devices 106a, 106b, 106c. As a result, the sensing devices 106a, 106b, 106c reactivate in advance of the time of arrival of the transporter 102 at the future coordinates, which enables the sensing devices 106a, 106b, 106c to adjust the sub-GHz frequency band utilized for communications with the gateway 104 prior to switching geographic regions.

At block 826, the gateway 104 communicates the sub-GHz frequency band to the sensing devices 106a, 106b, 106c based on the geographic location of the future coordinate. For example, the transmitter 332 transmits the sub-GHz frequency band associated with the future coordinates to the sensing devices 106a, 106b, 106c in response to the sensing devices 106a, 106b, 106c reaching the next wakeup interval and re-establishing contact with the gateway 104. Accordingly, the sensing devices 106a, 106b, 106c can utilize the received sub-GHz frequency band to communicate with the gateway 104 in response to entering the different geographic region associated with the future coordinates. As such, the sensing devices 106a, 106b, 106c are able to abide by the regulations of the geographic region by utilizing the frequency band associated therewith upon entering the geographic region.

At block 828, the gateway 104 retains a default wakeup interval in response to the future coordinates being located within the same geographic region as the coordinates of the transporter 102. For example, the low power mode processor 331 determines that the default wakeup interval is to be utilized in response to the future location frequency processor 304 indicating that the future coordinates are within the same geographic region as the location of the transporter 102. Accordingly, the destination processor 302 can communicate the default wakeup interval to the transmitter 332, which can transmit the default wakeup interval to the sensing devices 106a, 106b, 106c.

At block 830, the gateway 104 determines whether a destination has been reached. For example, the location interface 326 can compare the coordinates of the transporter 102 received via the GPS/GNSS 306 to coordinates of the destination location 110. In some examples, the computer readable instructions 620 return to block 706 in response to the coordinates of the transporter 102 being different from the coordinates of the destination location 110.

While an example manner of implementing the example sensing devices 106a, 106b, 106c of FIGS. 1, 4, and/or 5 is illustrated in FIG. 4, one or more of the elements, processes and/or devices illustrated in FIG. 4 may be combined, divided, re-arranged, omitted, eliminated and/or implemented in any other way. Further, the example gateway interface 402, the example frequency controller 404, the example low power mode interval timer 406, the example power processor 408, the example sensor(s) 410, and/or, more generally, the example sensing devices 106a, 106b, 106c of FIGS. 1, 4, and/or 5 may be implemented by hardware, software, firmware and/or any combination of hardware, software and/or firmware. Thus, for example, any of the example gateway interface 402, the example frequency controller 404, the example low power mode interval timer 406, the example power processor 408, the example sensor(s) 410, and/or, more generally, the example sensing devices 106a, 106b, 106c could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, gateway interface 402, the example frequency controller 404, the example low power mode interval timer 406, the example power processor 408, and/or the example sensor(s) 410 is/are hereby expressly defined to include a non-transitory computer readable storage device or storage disk such as a memory, a digital versatile disk (DVD), a compact disk (CD), a Blu-ray disk, etc. including the software and/or firmware. Further still, the example sensing devices 106a, 106b, 106c of FIGS. 1, 4, and/or 5 may include one or more elements, processes and/or devices in addition to, or instead of, those illustrated in FIG. 4, and/or may include more than one of any or all of the illustrated elements, processes, and devices.

A flowchart representative of example hardware logic, machine readable instructions, hardware implemented state machines, and/or any combination thereof for implementing the sensing devices 106a, 106b, 106c of FIGS. 1, 4, and/or 5 is shown in FIG. 9. The machine readable instructions may be one or more executable programs or portion(s) of an executable program for execution by a computer processor and/or processor circuitry, such as the processor 1112 shown in the example processor platform 1100 discussed below in connection with FIG. 11. The program may be embodied in software stored on a non-transitory computer readable storage medium such as a CD-ROM, a floppy disk, a hard drive, a DVD, a Blu-ray disk, or a memory associated with the processor 1112, but the entire program and/or parts thereof could alternatively be executed by a device other than the processor 1112 and/or embodied in firmware or dedicated hardware. Further, although the example program is described with reference to the flowchart illustrated in FIG. 9, many other methods of implementing the example sensing devices 106a, 106b, 106c may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

As mentioned above, the example process of FIG. 9 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

FIG. 9 is a flowchart representative of machine readable instructions 900 which may be executed to implement the example sensing devices 106a, 106b, 106c of FIGS. 1, 4, and/or 5. At block 902, the sensing devices 106a, 106b, 106c activate. For example, the power processor 408 of the sensing devices 106a, 106b, 106c can activate the sensing devices 106a, 106b, 106c in response to initialization and/or an expiration of a low power mode interval.

At block 904, the sensing devices 106a, 106b, 106c initialize the sensor(s) 410 associated therewith. For example, the sensor(s) 410 can begin monitoring conditions of the products and/or assets aboard the transporter 102 in response to the sensing devices 106a, 106b, 106c activating. In some examples, the sensor(s) 410 transmit measurements of the conditions to the gateway interface 402 periodically and/or in response to a request.

At block 906, the sensing devices 106a, 106b, 106c establish contact with the gateway 104. For example, the gateway interface 402 can communicate with the gateway 104 in response to the power processor 408 activating the sensing device 106a, 106b, 106c.

At block 908, the sensing device 106a, 106b, 106c downloads configuration settings from the gateway 104. For example, the gateway interface 402 can receive and/or obtain a low power mode interval and/or a frequency band from the gateway 104. In some examples, the gateway interface 402 transmits the frequency band to the frequency controller 404. In some examples, the gateway interface 402 transmits the low power mode interval to the low power mode timer 406.

At block 910, the sensing devices 106a, 106b, 106c determine whether a frequency band has been received and/or obtained from the gateway 104. For example, the frequency controller 404 can determine whether the frequency band has been received from the gateway interface 402. In some examples, the computer readable instructions 800 advance to block 816 in response to the frequency controller 404 not receiving the frequency band. In some examples, the computer readable instructions 800 continue to block 816 in response to the frequency controller 404 receiving the frequency band.

At block 912, the sensing devices 106a, 106b, 106c transmit a frequency receipt acknowledgement to the gateway 104. For example, the frequency controller 404 can transmit a notification to the gateway interface 402 in response to receiving the frequency band from the gateway interface 402. Further, the gateway interface 402 can transmit the frequency receipt acknowledge in response to receiving the notification from the frequency controller 404.

At block 914, the sensing devices 106a, 106b, 106c control the frequency band utilized for communications with the gateway 104. For example, the frequency controller 404 can adjust the frequency band that the devices 106a, 106b, 106c utilize to communicate with the gateway 104 based on the frequency band received via the gateway interface 402. In some examples, the frequency controller 404 is configured to implement the frequency band for communications a predetermined amount of time after receipt of the frequency band. Accordingly, the sensing devices 106a, 106b, 106c utilize the frequency band in response to entering a different geographic region.

At block 916, the sensing devices 106a, 106b, 106c transmit a reading of the sensor(s) 410 to the gateway 104. For example, the sensing devices 106a, 106b, 106c can communicate the reading of the sensor(s) with the gateway 104 via the frequency band implemented by the frequency controller 404. Accordingly, the sensing devices 106a, 106b, 106c comply with regulatory requirements associated with the geographic region and avoid loss of communications, fines, and/or other legal implications.

At block 918, the sensing devices 106a, 106b, 106c determine whether to enter a low power mode. For example, the low power mode interval timer 406 determines whether a low power mode has been received via the gateway interface 402. In some examples, the computer readable instructions 800 advance to block 820 in response to the sensing devices 106a, 106b, 106c receiving the low power mode. In some examples, the computer readable instructions 800 terminate in response to the sensing devices 106a, 106b, 106c not receiving the low power mode.

At block 920, the sensing devices 106a, 106b, 106c set a low power mode time (e.g., a sleep time, a TWT, etc.) based on the low power mode interval received from the gateway 104. For example, the low power mode interval timer 406 can activate and implement the low power time based on the low power mode interval indicated by the gateway 104. Further, the power processor 408 can reduce a power output of a battery of the device so that only the low power mode interval timer 406 receives power during the low power time. In some examples, the computer readable instructions 800 return to block 802 in response to an expiration of the low power time implemented by the low power mode interval timer 406.

Figure 10:
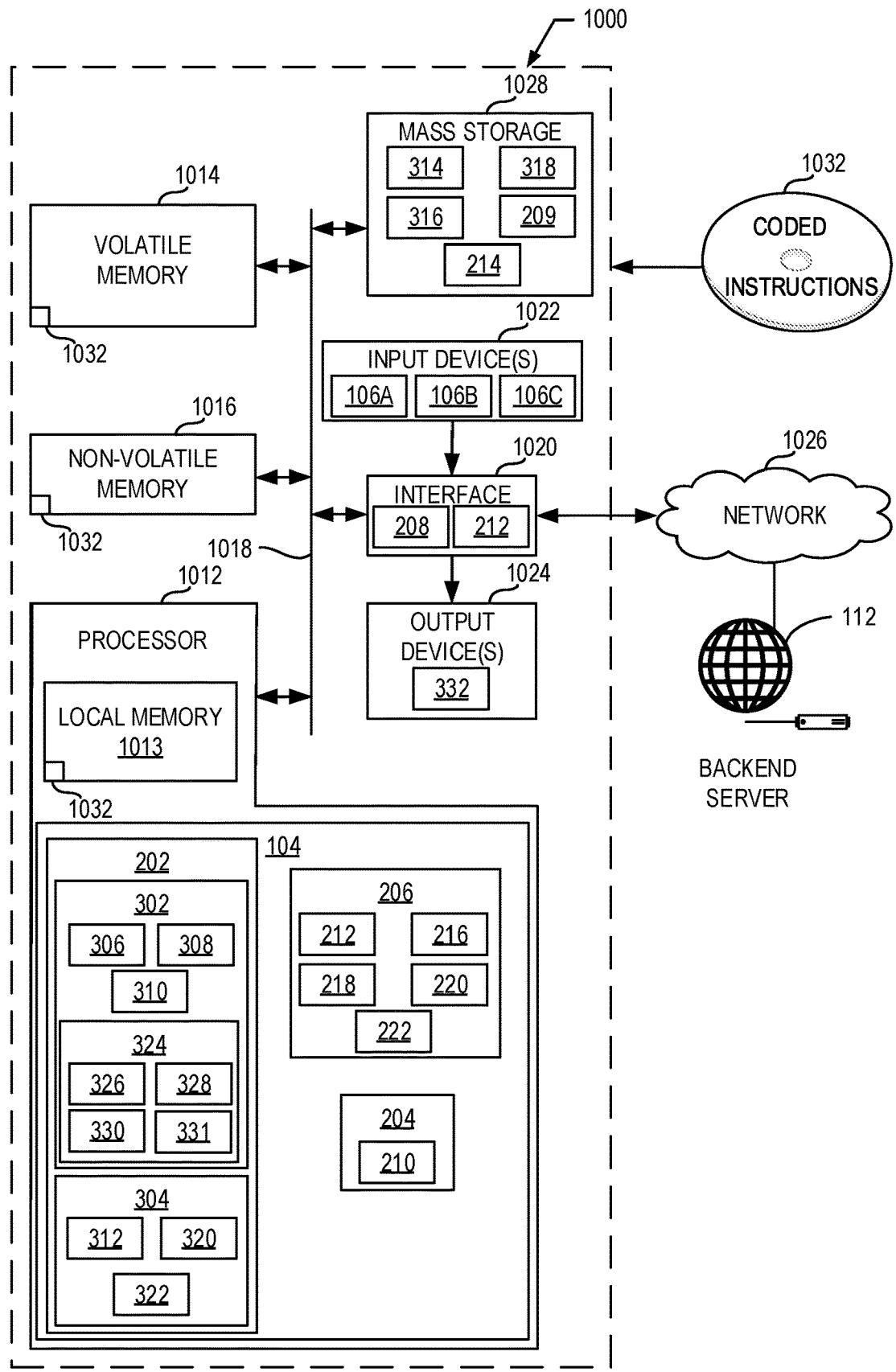
FIG. 10 is a block diagram of a first example processing platform structured to execute the instructions of FIGS. 6 and/or 7 to implement the example gateway of FIGS. 1, 2, 3, and/or 5.

FIG. 10 is a block diagram of an example processor platform 1000 structured to execute the instructions of FIGS. 6, 7 and/or 8 to implement the gateway 104 of FIGS. 1, 2, 3, and/or 5. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a Blu-ray player, a gaming console, a set top box, or any other type of computing device.

The processor platform 1000 of the illustrated example includes a processor 1012. The processor 1012 of the illustrated example is hardware. For example, the processor 1012 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1012 implements the example geographic frequency band processor 202, the example device data processor 204, the example data manager 206, the example device interface 208, the example device data correlator 210, the example timer 216, the example protocol determiner 218, the example data comparator 220, the example operation adjuster 222, the example destination processor 302, the example future location frequency processor 304, the example GPS/GNSS 306, the example compass 308, the example future location processor 310, the example communication interface 312, the example offline map database 314, the example geographic boundary database 316, the example geographic frequency band database 318, the example future location region identifier 320, the example device region comparator 322, the example future location arrival processor 324, the example location interface 326, the example speed processor 328, the example arrival time processor 330, the example low power mode processor 331, the example transmitter 332 and/or, more generally, the example gateway 104.

The processor 1012 of the illustrated example includes a local memory 1013 (e.g., a cache). The processor 1012 of the illustrated example is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1016 may be implemented by flash memory and/or any other desired type of memory device. Access to the main memory 1014, 1016 is controlled by a memory controller.

The processor platform 1000 of the illustrated example also includes an interface circuit 1020. The interface circuit 1020 may be implemented by any type of interface standard, such as an Ethernet interface, a universal serial bus (USB), a Bluetooth® interface, a near field communication (NFC) interface, and/or a PCI express interface. In this example, the interface circuit 1020 includes the example device interface 208 and the example communication interface 212.

In the illustrated example, one or more input devices 1022 are connected to the interface circuit 1020. The input device(s) 1022 permit(s) a user to enter data and/or commands into the processor 1012. The input device(s) can be implemented by, for example, a wireless frequency receiver, an audio sensor, a microphone, a camera (still or video), a keyboard, a button, a mouse, a touchscreen, a track-pad, a trackball, isopoint and/or a voice recognition system. In this example, the input devices 1022 communicatively couple the computing system 1100 to the example sensing devices 106a, 106b, 106c.

One or more output devices 1024 are also connected to the interface circuit 1020 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1020 of the illustrated example, thus, typically includes a graphics driver card, a graphics driver chip and/or a graphics driver processor. In this example, the output devices 1024 include the transmitter 332.

The interface circuit 1020 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1026. The communication can be via, for example, an Ethernet connection, a digital subscriber line (DSL) connection, a telephone line connection, a coaxial cable system, a satellite system, a line-of-site wireless system, a cellular telephone system, etc. In this example, the interface circuit 1020 includes the device interface 208 and the communication interface 212.

The processor platform 1000 of the illustrated example also includes one or more mass storage devices 1028 for storing software and/or data. Examples of such mass storage devices 1028 include floppy disk drives, hard drive disks, compact disk drives, Blu-ray disk drives, redundant array of independent disks (RAID) systems, and digital versatile disk (DVD) drives.

The machine executable instructions 1032 of FIGS. 6, 7 and/or 8 may be stored in the mass storage device 1028, in the volatile memory 1014, in the non-volatile memory 1016, and/or on a removable non-transitory computer readable storage medium such as a CD or DVD.

Figure 11:
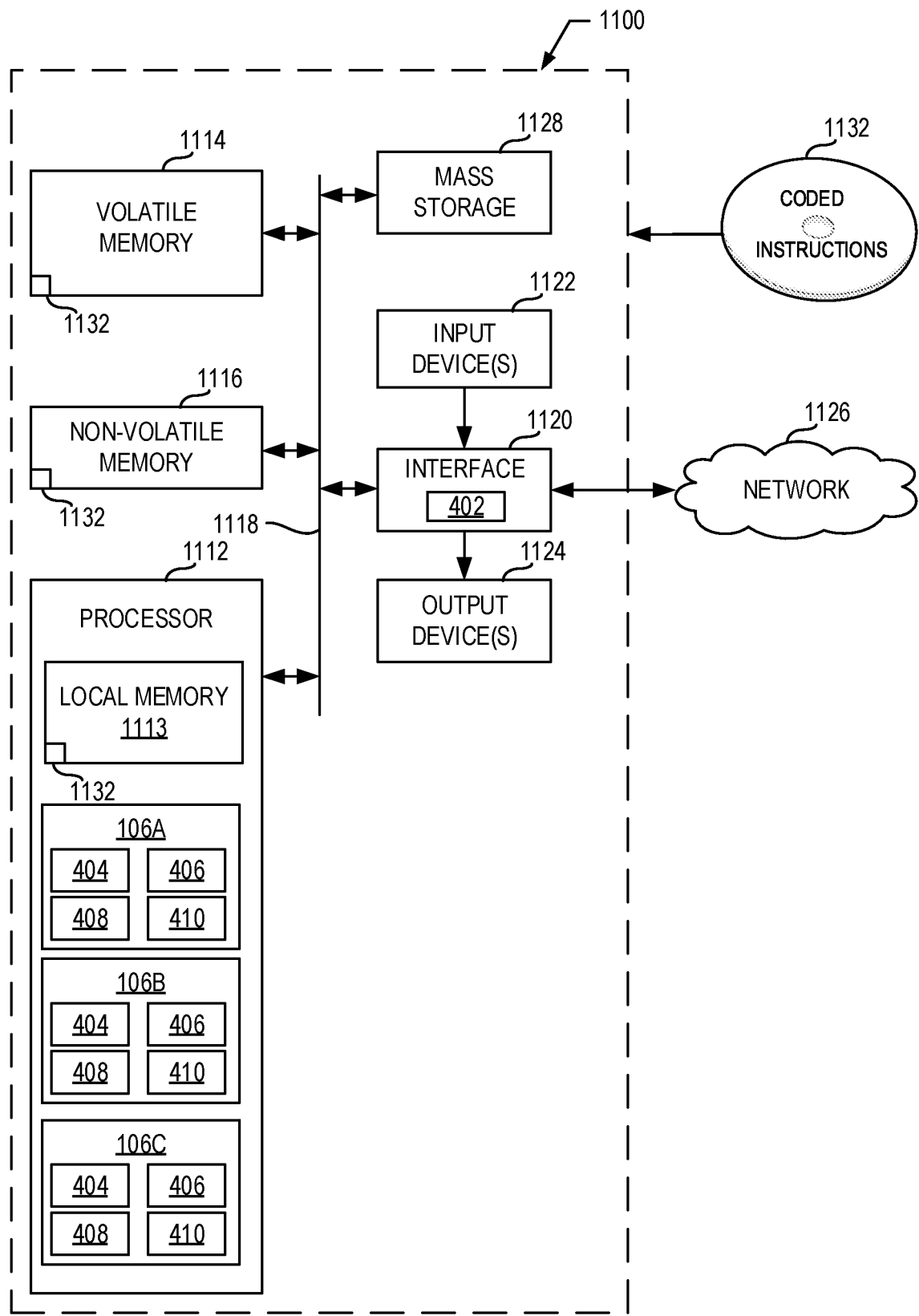
FIG. 11 is a second block diagram of a second example processing platform structured to execute the instructions of FIG. 8 to implement the example edge device(s) of FIGS. 1, 4, and/or 5.

FIG. 11 is a block diagram of an example processor platform 1000 structured to execute the instructions of FIG. 9 to implement the sensing devices 106a, 106b, 106c of FIGS. 1, 4, and/or 5. The processor platform 1100 can be, for example, a personal computer, a workstation, a self-learning machine (e.g., a neural network), a mobile device (e.g., a tablet such as an iPad™), a personal digital assistant (PDA), a DVD player, a CD player, a digital video recorder, a gaming console, a personal video recorder, a set top box, or any other type of computing device.

The processor platform 1100 of the illustrated example includes a processor 1112. The processor 1112 of the illustrated example is hardware. For example, the processor 1112 can be implemented by one or more integrated circuits, logic circuits, microprocessors, GPUs, DSPs, or controllers from any desired family or manufacturer. The hardware processor may be a semiconductor based (e.g., silicon based) device. In this example, the processor 1112 implements the example frequency controller 404, the example low power mode interval timer 406, the example power processor 408, and the example sensor(s) 410.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1116 may be implemented by flash memory and/or any other desired type of memory device. Access to the main memory 1114, 1116 is controlled by a memory controller.

The processor platform 1100 of the illustrated example also includes an interface circuit 1120. The interface circuit 1120 may be implemented by any type of interface standard, such as a universal serial bus (USB), a near field communication (NFC) interface, and/or a PCI express interface. In this example, the interface circuit 1120 includes the gateway interface 402.

In the illustrated example, one or more input devices 1122 are connected to the interface circuit 1120. The input device(s) 1122 permit(s) a user to enter data and/or commands into the processor 1012. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1024 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1120 of the illustrated example, thus, typically includes a graphics driver card, a graphics driver chip and/or a graphics driver processor.

The interface circuit 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1126. The communication can be via, for example, a wireless frequency receiver and transmitter, a digital subscriber line (DSL) connection, a line-of-site wireless system, etc. In this example, the interface circuit includes the example gateway interface 402.

The processor platform 1100 of the illustrated example also includes one or more mass storage devices 1128 for storing software and/or also may include data. Examples of such mass storage devices 1128 include floppy disk drives, hard drive disks, compact disk drives, Blu-ray disk drives, redundant array of independent disks (RAID) systems, and digital versatile disk (DVD) drives.

The machine executable instructions 1132 of FIG. 9 may be stored in the mass storage device 1128, in the volatile memory 1114, in the non-volatile memory 1116, and/or on a removable non-transitory computer readable storage medium such as a CD or DVD.

Figure 12:
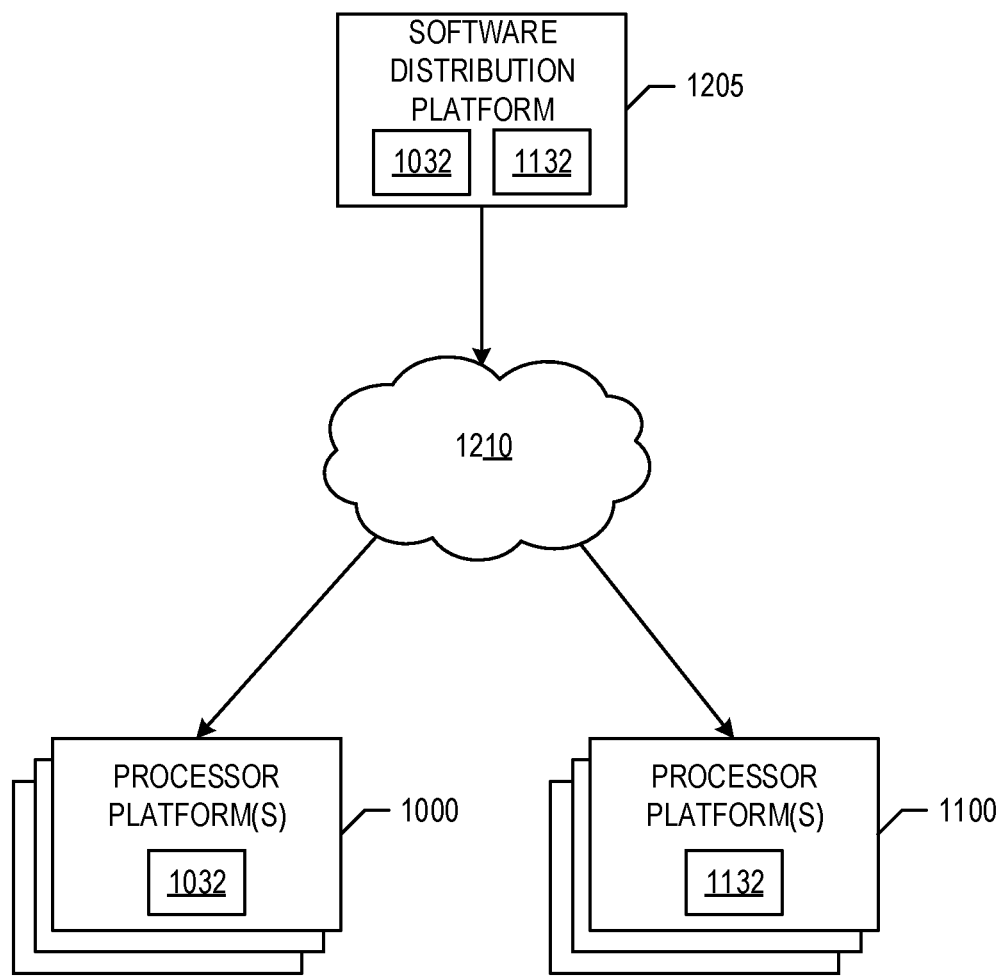
FIG. 12 is a block diagram of an example software distribution platform to distribute software (e.g., software corresponding to the example computer readable instructions of FIGS. 6, 7, 8, and/or 9) to client devices such as the example gateway of FIGS. 1, 2, 3, and/or 5, the example devices of FIGS. 1, 4, and/or 5, consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1205 to distribute software such as the example computer readable instructions 1032, 1132 of FIGS. 10 and 11 to third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1032, 1132 of FIGS. 10 and 11. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the computer readable instructions 1032, 1132, which may correspond to the example computer readable instructions 1032, 1132 of FIGS. 10 and 11, as described above. The one or more servers of the example software distribution platform 1205 are in communication with a network 1210, which may correspond to any one or more of the Internet and/or any of the example networks 1026, 1126 described above. In some examples, the software distribution platform 1205 is in communication with the backend server 112. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1032, 1132 from the software distribution platform 1205. For example, the software, which may correspond to the example computer readable instructions 1032, 1132 of FIGS. 10 and 11, may be downloaded to the example processor platforms 1000, 1100, which are to execute the computer readable instructions 1032, 1132 to implement the geographic frequency band processor 202 of the gateway 104 and the sensing devices 106a, 106b, 106c. In some example, one or more servers of the software distribution platform 1205 periodically offer, transmit, and/or force updates to the software (e.g., the example computer readable instructions 1032, 1132 of FIGS. 10 and 11) to ensure improvements, patches, updates, etc. are distributed and applied to the software at the end user devices.

From the foregoing, it will be appreciated that example methods, apparatus and articles of manufacture have been disclosed that dynamically control the usage of frequency bands for communications. Examples disclosed herein determine a geographic region and a communication frequency associated with a future location of a device. Accordingly, the device is able to use the communication frequency associated with the future location of the device upon entering the geographic region associated with the future location. As a result, the device avoids loss of communications, fines, and/or other legal implication that can occur from using an incorrect wireless communication frequency. Examples disclosed herein determine a low power mode interval to be implemented by the device based on a time of arrival of the device at the geographic region associated with the future location of the device. As such, examples disclosed herein efficiently manage and/or preserve a battery of the device to avoid losing battery power during a voyage.

Example methods, apparatus, systems, and articles of manufacture to control usage of frequency bands for wireless communications are disclosed herein. Further examples and combinations thereof include the following:

Example 1 includes an apparatus comprising a future location frequency processor to determine a geographic region associated with a future location of a device, and a transmitter to transmit a low power mode interval to the device based on the future location of the device.

Example 2 includes the apparatus of example 1, further including a destination processor to determine the future location of the device based on a location of the device, a substantial bearing of the device, and at least one distance from the location of the device.

Example 3 includes the apparatus of example 1, further including a destination processor to determine one or more of (i) at least one of a first future location of the device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device.

Example 4 includes the apparatus of example 3, further including a future location arrival processor to determine a time of arrival of the device at the future location based on a future location nearest to the location of the device, the geographic region associated with the future location nearest to the location of the device being different from a geographic region associated with the location of the device.

Example 5 includes the apparatus of example 1, wherein the transmitter is to transmit a default low power mode interval to the device in response to the geographic region associated with the future location of the device being identical to a geographic region associated with a location of the device.

Example 6 includes the apparatus of example 5, further including a destination processor to redetermine the future location of the device in response to an expiration of the default low power mode interval.

Example 7 includes the apparatus of example 1, further including a future location arrival processor to determine a time of arrival of the device at the future location based on a speed of the device in response to the geographic region associated with the future location being different from a geographic region associated with a location of the device.

Example 8 includes the apparatus of example 1, wherein the low power mode interval is to enable the device to activate in advance of a time of arrival of the device at the future location.

Example 9 includes the apparatus of example 1, wherein the transmitter is to transmit a frequency band associated with the future location to the device following the low power mode interval.

Example 10 includes a method comprising determining a geographic region associated with a future location of a device, and transmitting a low power mode interval to the device based on the future location.

Example 11 includes the method of example 10, further including determining the future location of the device based on a location of the device, a substantial bearing of the device, and at least one distance from the location of the device.

Example 12 includes the method of example 10, further including determining one or more of (i) at least one of a first future location of the device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device.

Example 13 includes the method of example 12, further including determining a time of arrival of the device at the future location based on a future location nearest to the location of the device, the geographic region associated with the future location nearest to the location of the device being different from a geographic region associated with the location of the device.

Example 14 includes the method of example 10, further including transmitting a communication frequency associated with the future location to the device.

Example 15 includes the method of example 10, wherein the low power mode interval is based on a default low power mode interval in response to the geographic region associated with the future location being identical to a geographic region associated with the device.

Example 16 includes the method of example 15, further including redetermining the future location of the device in response to an expiration of the low power mode interval.

Example 17 includes the method of example 10, further including determining a time of arrival of the device at the future location is based on a speed of the device in response to the geographic region associated with the future location being different from a geographic region associated with a location of the device.

Example 18 includes the method of example 17, wherein the low power mode interval is to enable the device to activate in advance of the time of arrival at the future location.

Example 19 includes One or more non-transitory computer readable media comprising instructions that, when executed, cause one or more processors to at least determine a geographic region associated with a future location of a device, and transmit a low power mode interval to the device based on the future location.

Example 20 includes the one or more non-transitory computer readable media of example 19, wherein the instructions, when executed, cause the one or more processors to determine the future location of the device based on a location of the device, a substantial bearing of the device, and at least one distance from the location of the device.

Example 21 includes the one or more non-transitory computer readable media of example 19, wherein the instructions, when executed, cause the one or more processors to determine one or more of (i) at least one of a first future location of the device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device.

Example 22 includes the one or more non-transitory computer readable media of example 21, wherein the instructions, when executed, cause the one or more processors to determine a time of arrival of the device at the future location based on a future location nearest to the location of the device, the geographic region associated with the future location nearest to the location of the device being different from a geographic region associated with the location of the device.

Example 23 includes the one or more non-transitory computer readable media of example 19, wherein the instructions, when executed, cause the one or more processors to transmit a communication frequency associated with the future location to the device.

Example 24 includes the one or more non-transitory computer readable media of example 19, wherein the low power mode interval is to enable the device to activate in advance of a time of arrival of the device at the future location.

Example 25 includes the one or more non-transitory computer readable media of example 19, wherein the low power mode interval is based on a default low power mode interval in response to the geographic region associated with the future location being identical to a geographic region associated with a location of the device.

Example 26 includes the one or more non-transitory computer readable media of example 24, wherein the instructions, when executed, cause the one or more processors to redetermine the future location of the device in response to an expiration of the low power mode interval.

Example 27 includes the one or more non-transitory computer readable media of example 19, wherein the instructions, when executed, cause the one or more processors to determine an arrival time of the device at the future location based on a speed of the device in response to the geographic region associated with the future location of the device being different from a geographic region associated with a location of the device.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
  a future location frequency processor to determine a geographic region associated with a future location of a device; and
  a transmitter to transmit a low power mode interval to the device based on the future location of the device, the low power mode interval to enable the device to activate in advance of a time of arrival of the device at the future location.

2. The apparatus of claim 1, further including a destination processor to determine the future location of the device based on a location of the device, a substantial bearing of the device, and at least one distance from the location of the device.

3. The apparatus of claim 1, further including a destination processor to determine one or more of (i) at least one of a first future location of the device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device.

4. The apparatus of claim 1, further including a future location arrival processor to determine a time of arrival of the device at the future location based on a speed of the device in response to the geographic region associated with the future location being different from a geographic region associated with a location of the device.

5. The apparatus of claim 1, wherein the transmitter is to transmit a frequency band associated with the future location to the device following the low power mode interval.

6. An apparatus comprising:
  a destination processor to determine one or more of (i) at least one of a first future location of a device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device;
  a future location frequency processor to determine a geographic region associated with at least one of the first future location, the second future location, the third future location, the fourth future location, the fifth future location, the sixth future location, the seventh future location, the eighth future location, or the ninth future location;
  a future location arrival processor to determine a time of arrival of the device at one of the first future location, the second future location, the third future location, the fourth future location, the fifth future location, the sixth future location, the seventh future location, the eighth future location, or the ninth future location based on a future location nearest to the location of the device, the geographic region associated with the future location nearest to the location of the device being different from a geographic region associated with the location of the device; and
  a transmitter to transmit a low power mode interval to the device based on the future location of the device.

7. An apparatus comprising:
  a future location frequency processor to determine a geographic region associated with a future location of a device; and
  a transmitter to transmit a low power mode interval to the device based on the future location of the device, the transmitter is to transmit a default low power mode interval to the device in response to the geographic region associated with the future location of the device being identical to a geographic region associated with a location of the device.

8. The apparatus of claim 7, further including a destination processor to redetermine the future location of the device in response to an expiration of the default low power mode interval.

9. The apparatus of claim 7, wherein the low power mode interval is to enable the device to activate in advance of a time of arrival of the device at the future location.

10. A method comprising:
  determining a geographic region associated with a future location of a device;
  determining a time of arrival of the device at the future location based on a speed of the device in response to the geographic region associated with the future location being different from a geographic region associated with a location of the device; and
  transmitting a low power mode interval to the device based on the future location.

11. The method of claim 10, further including determining the future location of the device based on a location of the device, a substantial bearing of the device, and at least one distance from the location of the device.

12. The method of claim 10, further including determining one or more of (i) at least one of a first future location of the device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device.

13. The method of claim 12, further including determining a time of arrival of the device at the future location based on a future location nearest to the location of the device, the geographic region associated with the future location nearest to the location of the device being different from a geographic region associated with the location of the device.

14. The method of claim 10, further including transmitting a communication frequency associated with the future location to the device.

15. The method of claim 10, wherein the low power mode interval is based on a default low power mode interval in response to the geographic region associated with the future location being identical to a geographic region associated with the device.

16. The method of claim 15, further including redetermining the future location of the device in response to an expiration of the low power mode interval.

17. The method of claim 10, wherein the low power mode interval is to enable the device to activate in advance of the time of arrival at the future location.

18. One or more non-transitory computer readable media comprising instructions that, when executed, cause one or more processors to at least:
   determine a future location of a device based on a location of the device, a substantial bearing of the device, and at least one distance from the location of the device;
   determine a geographic region associated with the future location of the device; and
   transmit a low power mode interval to the device based on the future location.

19. The one or more non-transitory computer readable media of claim 18, wherein the instructions, when executed, cause the one or more processors to determine one or more of (i) at least one of a first future location of the device, a second future location of the device, or a third future location of the device based on a substantial bearing of the device and a first distance from a location of the device, (ii) at least one of a fourth future location of the device, a fifth future location of the device, or a sixth future location of the device based on the substantial bearing of the device and a second distance from the location of the device, or (iii) at least one of a seventh future location of the device, an eighth future location of the device, or a ninth future location of the device based on the substantial bearing of the device and a third distance from the location of the device.

20. The one or more non-transitory computer readable media of claim 19, wherein the instructions, when executed, cause the one or more processors to determine a time of arrival of the device at the future location based on a future location nearest to the location of the device, the geographic region associated with the future location nearest to the location of the device being different from a geographic region associated with the location of the device.

21. The one or more non-transitory computer readable media of claim 18, wherein the instructions, when executed, cause the one or more processors to transmit a communication frequency associated with the future location to the device.

22. The one or more non-transitory computer readable media of claim 18, wherein the low power mode interval is to enable the device to activate in advance of a time of arrival of the device at the future location.

23. The one or more non-transitory computer readable media of claim 22, wherein the instructions, when executed, cause the one or more processors to redetermine the future location of the device in response to an expiration of the low power mode interval.

24. The one or more non-transitory computer readable media of claim 18, wherein the low power mode interval is based on a default low power mode interval in response to the geographic region associated with the future location being identical to a geographic region associated with a location of the device.

25. The one or more non-transitory computer readable media of claim 18, wherein the instructions, when executed, cause the one or more processors to determine an arrival time of the device at the future location based on a speed of the device in response to the geographic region associated with the future location of the device being different from a geographic region associated with a location of the device.

* * * * *